US012604365B2

(12) United States Patent
Li et al.

(10) Patent No.: US 12,604,365 B2
(45) Date of Patent: Apr. 14, 2026

(54) COMMUNICATION METHOD AND COMMUNICATION APPARATUS

(71) Applicant: HUAWEI TECHNOLOGIES CO., LTD., Guangdong (CN)

(72) Inventors: Meng Li, Beijing (CN); Jiangwei Ying, Beijing (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 275 days.

(21) Appl. No.: 18/337,054

(22) Filed: Jun. 19, 2023

(65) Prior Publication Data

US 2023/0337325 A1 Oct. 19, 2023

Related U.S. Application Data

(63) Continuation of application No. PCT/CN2020/142542, filed on Dec. 31, 2020.

(51) Int. Cl.
H04W 76/38 (2018.01)
H04W 76/20 (2018.01)
(52) U.S. Cl.
CPC ........... H04W 76/38 (2018.02); H04W 76/20 (2018.02)
(58) Field of Classification Search
CPC ...... H04L 12/18; H04L 1/1835; H04W 76/27; H04W 36/0007; H04W 36/08;
(Continued)

(56) References Cited

U.S. PATENT DOCUMENTS

2013/0279395 A1 10/2013 Aramoto et al.
2016/0226672 A1* 8/2016 Calciu .................. H04L 12/185
(Continued)

FOREIGN PATENT DOCUMENTS

CN 110972078 A 4/2020
CN 111107673 A 5/2020
(Continued)

OTHER PUBLICATIONS

3GPP TS 23.501 V16.7.0 (Dec. 2020),3rd Generation Partnership Project; Technical Specification Group Services and System Aspects; System architecture for the 5G System (5GS); Stage 2(Release 16), Dec. 2020, total 442 pages.
(Continued)

*Primary Examiner* — Iqbal Zaidi

(57) ABSTRACT

This application provides a communication method and a communication apparatus. In a technical solution of this application, when a preset condition is met, an access network device notifies user equipment that a multicast session is to be released or is to be deactivated. If the multicast session is being used or is to be used, the user equipment may feed back to the access network device that the user equipment is still interested in a multicast service. The access network device may determine, based on whether the feedback from the user equipment is received within a preset time period, whether to continue to release or deactivate the multicast session. In this way, when user equipment in an idle state can receive multicast data, this technical solution can properly manage the multicast session.

11 Claims, 13 Drawing Sheets

(58) Field of Classification Search
      CPC ..... H04W 52/02; H04W 76/28; H04W 76/40;
                          H04W 76/20; H04W 76/50
      See application file for complete search history.

(56)                    References Cited

U.S. PATENT DOCUMENTS

2021/0021967 A1* 1/2021 Kamei .................. H04W 76/40
2023/0309188 A1* 9/2023 Belling ................ H04N 21/222

FOREIGN PATENT DOCUMENTS

JP      2002171548 A    6/2002
JP      2010541434 A    12/2010
JP      2012104974 A    5/2012
JP      2013534087 A    8/2013

OTHER PUBLICATIONS

3GPP TS 24.501 V17.1.0 (Dec. 2020),3rd Generation Partnership
Project; Technical Specification Group Core Network and Termi-
nals; Non-Access-Stratum (NAS) protocol, for 5G System (5GS)Stage
3;(Release 17), total 746 pages.
3GPP TS 23.502 V16.7.0 (Dec. 2020), 3rd Generation Partnership
Project; Technical Specification Group Services and System Aspects;
Procedures for the 5G System (5GS); Stage 2,(Release 16), total 597
pages.
3GPP TSG-WG SA2 Meeting #140E e-meeting, S2-2006308, "KI#1:
New Solution for MBS Session (activate, deactivate)", Huawei,
HiSilicon, Nokia, Nokia Shanghai-Bell, Elbonia, Aug. 19-Sep. 1,
2020, total 8 pages.

* cited by examiner

COMMUNICATION METHOD AND COMMUNICATION APPARATUS

CROSS-REFERENCE TO RELATED APPLICATIONS

This application is a continuation of International Application No. PCT/CN2020/142542, filed on Dec. 31, 2020, the disclosure of which is hereby incorporated by reference in its entirety.

TECHNICAL FIELD

This application relates to the communication field, and more specifically, to a communication method and a communication apparatus.

BACKGROUND

For multicast transmission, when user equipment is in an idle state, an association between the user equipment and a multicast group is already released by a network side. When there is no associated user equipment in the multicast group, the network side may release or deactivate a multicast session corresponding to the multicast group.

Currently, a conventional technology supports the user equipment in receiving multicast data when the user equipment is in the idle state. Specifically, when the user equipment enters the idle state from a connected state, the user equipment still stores a multicast receiving parameter used when the user equipment is in the connected state, so that the user equipment in the idle state may receive the multicast data by using the multicast receiving parameter. It can be learned that when there is no associated user equipment in a specific multicast group, it is also possible that user equipment in an idle state is receiving or is about to receive data by using a multicast session corresponding to the multicast group. In this case, if the multicast session is released or deactivated, transmission of multicast data of the idle-state user equipment is affected.

In view of the foregoing situation, how to manage the multicast session becomes a problem to be urgently resolved.

SUMMARY

This application provides a communication method and a communication apparatus, to properly manage a multicast session when user equipment in an idle state can receive multicast data.

According to a first aspect, this application provides a communication method. The method includes: An access network device broadcasts a first message when a preset condition is met, where the first message is used to notify that a first multicast session is to be released or is to be deactivated; and if the access network device receives, within a first preset time period, no second message that responds to the first message, the access network device releases or deactivates the first multicast session; and/or if the access network device receives, within a first preset time period, a second message that responds to the first message, the access network device retains the first multicast session.

The preset condition may be used to release or deactivate the first multicast session.

The releasing or deactivating the first multicast session may be understood as releasing or deactivating a context of the first multicast session.

The retaining the first multicast session may also be described as not releasing or deactivating the first multicast session, or giving up releasing or giving up deactivating the first multicast session.

Optionally, the second message may be used to: request or notify to release or deactivate the first multicast session, indicate that data is being or is to be received by using the first multicast session, only respond to the first message (in this case, the user equipment may not send a response message if the data is not received by using the first multicast session), request to establish a radio resource control (RRC) connection and optionally carry information about an activated multicast session, and the like.

Optionally, the second message is an air interface message, for example, an RRC message.

In the foregoing technical solution, when the preset condition is met, the access network device notifies the user equipment that the first multicast session is to be released or is to be deactivated, so that the user equipment may feed back to the access network device that the user equipment is using or is about to use the first multicast session. In this way, the access network device determines, based on the feedback of the user equipment, whether to continue to release or deactivate the first multicast session. When user equipment in an idle state can receive multicast data, the multicast session can be properly managed.

With reference to the first aspect, in a possible implementation, the preset condition includes at least one of the following: no data is transmitted in the first multicast session within a second preset time period; there is no associated user equipment in a multicast group; or a first timer times out, where the first timer is used to monitor whether there is user equipment receiving data by using the first multicast session.

With reference to the first aspect or any one of the foregoing implementations, in another possible implementation, the method further includes: The access network device sends a third message to a core network device, where the third message is used to request to release or deactivate the first multicast session.

With reference to the first aspect or any one of the foregoing implementations, in another possible implementation, that the access network device sends a third message to a core network device includes: The access network device sends the third message to the core network device after the first preset time period.

In the foregoing technical solution, the access network device requests the core network device to release or deactivate the first multicast session after the first preset time period. In other words, the access network device requests the core network device to release or deactivate the first multicast session only after determining to release or deactivate the first multicast session. In this way, implementation of the core network device is simple.

With reference to the first aspect or any one of the foregoing implementations, in another possible implementation, that the access network device sends a third message to a core network device includes: The access network device sends the third message to the core network device before the first preset time period.

In the foregoing technical solution, before determining whether to release or deactivate the first multicast session, the access network device requests the core network device in advance to release or deactivate the first multicast session. In this way, a delay of releasing or deactivating the first multicast session can be reduced.

With reference to the first aspect or any one of the foregoing implementations, in another possible implementation, the method further includes: If the access network device receives the second message within the first preset time period, the access network device sends a fifth message to the core network device, where the fifth message is used to request the core network device to retain the first multicast session.

In the foregoing technical solution, when the access network device has requested the core network device to release or deactivate the first multicast session, if the access network device receives the second message within the first preset time period, the access network device may notify the core network device of retaining the first multicast session, to prevent the core network device from releasing the first multicast session.

With reference to the first aspect or any one of the foregoing implementations, in another possible implementation, the second message is from the user equipment.

With reference to the first aspect or any one of the foregoing implementations, in another possible implementation, the second message is an RRC message.

According to a second aspect, this application provides a communication method. The method includes: User equipment receives a first message from an access network device, where the first message is used to notify that a first multicast session is to be released or is to be deactivated; and if the user equipment is receiving or is about to receive data by using the first multicast session, the user equipment sends, to the access network device, a second message that responds to the first message.

Optionally, the second message may be used to: request or notify to release or deactivate the first multicast session, indicate that data is being or is to be received by using the first multicast session, only respond to the first message (in this case, the user equipment may not send a response message if the data is not received by using the first multicast session), request to establish an RRC connection and optionally carry information about an activated multicast session, and the like.

Optionally, the second message is an air interface message, for example, an RRC message.

In the foregoing technical solution, the access network device may notify the user equipment that the first multicast session is to be released or is to be deactivated. If the user equipment is using or is about to use the first multicast session, the user equipment may feed back to the access network device that the user equipment is using or is about to use the first multicast session. In this way, the access network device determines, based on the feedback of the user equipment, whether to continue to release or deactivate the first multicast session. When user equipment in an idle state can receive multicast data, the multicast session can be properly managed.

With reference to the second aspect, in a possible implementation, the user equipment is in an idle state or an RRC inactive state.

With reference to the second aspect or any one of the foregoing implementations, in another possible implementation, the air interface message is an RRC message.

According to a third aspect, this application provides a communication method. The method includes: A core network device receives a third message from an access network device, where the third message is used to request to release or deactivate a first multicast session; and the core network device releases or deactivates the first multicast session based on the third message.

In the foregoing technical solution, when receiving the request from the access network device, the core network device may release or deactivate the first multicast session. When user equipment in an idle state can receive multicast data, the multicast session can be properly managed.

According to a fourth aspect, this application provides a communication method. The method includes: A core network device receives a third message from an access network device, where the third message is used to request to release or deactivate a first multicast session; and if the core network device receives no fifth message within a third preset time period, the core network device releases or deactivates the first multicast session; and/or if the core network device receives a fifth message within a third preset time period, the core network device retains the first multicast session, where the fifth message indicates to retain the first multicast session.

In the foregoing technical solution, when the access network device has requested the core network device to release or deactivate the first multicast session, if the access network device receives the second message within the first preset time period, the access network device may notify the core network device of retaining the first multicast session. When user equipment in an idle state can receive multicast data, the multicast session can be properly managed.

According to a fifth aspect, this application provides a communication method. The method includes: An access network device broadcasts a sixth message when a preset condition is met, where the sixth message is used to notify that a first multicast session is to be released or is to be deactivated; and if the access network device receives no eighth message from a core network device within a first preset time period, the access network device releases or deactivates the first multicast session; and/or if the access network device receives an eighth message from a core network device within a first preset time period, the access network device retains the first multicast session, where the eighth message is used by user equipment to request to join the first multicast session.

The preset condition may be used to release or deactivate the first multicast session.

The releasing or deactivating the first multicast session may be understood as releasing or deactivating a context of the first multicast session.

The retaining the first multicast session may also be described as not releasing or deactivating the first multicast session, or giving up releasing or giving up deactivating the first multicast session.

Optionally, the eighth message may be used to: request or notify to release or deactivate the first multicast session, indicate that data is being or is to be received by using the first multicast session, only respond to the sixth message (in this case, the user equipment may not send a response message if the data is not received by using the first multicast session), and the like.

Optionally, the eighth message may be an N2 message.

In the foregoing technical solution, when the preset condition is met, the access network device notifies the user equipment that the first multicast session is to be released or is to be deactivated, so that the user equipment may feed back to the core network device that the user equipment is using or is about to use the first multicast session, and then the core network device feeds back, to the access network device, that the user equipment is still using or is about to use the first multicast session. In this way, the access network device determines, based on the feedback of the user equipment, whether to continue to release or deactivate the first multicast session. When user equipment in an idle state can receive multicast data, the multicast session can be properly managed.

With reference to the fifth aspect, in a possible implementation, the preset condition includes at least one of the following: no data is transmitted in the first multicast session within a second preset time period; there is no associated user equipment in a multicast group; or a first timer times out, where the first timer is used to monitor whether there is user equipment receiving data by using the first multicast session.

With reference to the fifth aspect or any one of the foregoing implementations, in another possible implementation, the method further includes: The access network device sends a ninth message to the core network device before the first preset time period, where the ninth message is used to request to release or deactivate the first multicast session.

In the foregoing technical solution, before determining whether to release or deactivate the first multicast session, the access network device requests the core network device in advance to release or deactivate the first multicast session. In this way, a delay of releasing or deactivating the first multicast session can be reduced.

With reference to the fifth aspect or any one of the foregoing implementations, in another possible implementation, the method further includes: If no eighth message is received within the first preset time period, the access network device sends a ninth message to the core network device, where the ninth message is used to request to release or deactivate the first multicast session.

In the foregoing technical solution, the access network device requests the core network device to release or deactivate the first multicast session after the first preset time period. In other words, the access network device requests the core network device to release or deactivate the first multicast session only after determining to release or deactivate the first multicast session. In this way, implementation of the core network device is simple.

According to a sixth aspect, this application provides a communication method. The method includes: User equipment receives a sixth message from an access network device, where the sixth message is used to notify that a first multicast session is to be released or is to be deactivated; and if the user equipment is receiving or is about to receive data by using the first multicast session, the user equipment sends a seventh message to a core network device, where the seventh message is used to request to join the first multicast session.

Optionally, the seventh message may be used to: request or notify to release or deactivate the first multicast session, indicate that data is being or is to be received by using the first multicast session, only respond to the sixth message (in this case, the user equipment may not send a response message if the data is not received by using the first multicast session), and the like.

Optionally, the seventh message is a non-access stratum (NAS) message.

In the foregoing technical solution, the access network device may notify the user equipment that the first multicast session is to be released or is to be deactivated. If the user equipment is using or is about to use the first multicast session, the user equipment may feed back to the core network device that the user equipment is using or is about to use the first multicast session. In this way, the access network device determines, based on the feedback of the user equipment, whether to continue to release or deactivate the first multicast session. When user equipment in an idle state can receive multicast data, the multicast session can be properly managed.

According to a seventh aspect, this application provides a communication method. The method includes: A core network device receives a seventh message from user equipment, where the seventh message is used to request to join a first multicast session; and the core network device sends an eighth message to an access network device, where the eighth message is used to request to add the user equipment to the first multicast session.

Optionally, the seventh message and the eighth message may be used to: request or notify to release or deactivate the first multicast session, indicate that data is being or is to be received by using the first multicast session, only respond to the sixth message (in this case, the user equipment may not send a response message if the data is not received by using the first multicast session), and the like.

Optionally, the seventh message is an NAS message.

Optionally, the eighth message is an N2 message.

In the foregoing technical solution, if the user equipment is using or is about to use the first multicast session, the user equipment may feed back to the core network device that the user equipment is using or is about to use the first multicast session, and the core network device may feed back to the access network device that the user equipment still uses the first multicast session. In this way, the access network device determines, based on the feedback of the user equipment, whether to continue to release or deactivate the first multicast session. When user equipment in an idle state can receive multicast data, the multicast session can be properly managed.

According to an eighth aspect, this application provides a communication method. The method includes: A core network device receives a ninth message from an access network device, where the ninth message is used to request to release or deactivate a first multicast session; and if the core network device receives no seventh message from user equipment within a second preset time period, the core network device releases or deactivates the first multicast session; and/or if the core network device receives a seventh message from user equipment within a second preset time period, the core network device retains the first multicast session, and sends an eighth message to the access network device, where the eighth message is used to request to add the user equipment to the first multicast session, where the seventh message is used to request to join the first multicast session.

In the foregoing technical solution, after receiving the seventh message, the core network device may learn, based on the seventh message, that the user equipment is still using or is about to use the first multicast session, to determine that the first multicast session should be retained, and request the access network device to add the user equipment to the first multicast session. In this way, the access network device determines, based on the feedback of the user equipment, whether to continue to release or deactivate the first multicast session. When user equipment in an idle state can receive multicast data, the multicast session can be properly managed.

According to a ninth aspect, this application provides a communication apparatus. The apparatus includes:

a transceiver unit, configured to broadcast a first message when a preset condition is met, where the first message is used to notify that a first multicast session is to be released or is to be deactivated; and a processing unit, configured to: if no second message that responds to the first message is received within a first preset time period, release or deactivate the first multicast session; and/or if a second message that responds to the first message is received within a first preset time period, retain the first multicast session.

Optionally, the communication apparatus may be an access network device.

The preset condition is used to release or deactivate the first multicast session.

The releasing or deactivating the first multicast session may be understood as releasing or deactivating a context of the first multicast session.

The retaining the first multicast session may also be described as not releasing or deactivating the first multicast session, or giving up releasing or giving up deactivating the first multicast session.

Optionally, the second message may be used to: request or notify to release or deactivate the first multicast session, indicate that data is being or is to be received by using the first multicast session, only respond to the first message (in this case, the user equipment may not send a response message if the data is not received by using the first multicast session), request to establish an RRC connection and optionally carry information about an activated multicast session, and the like.

Optionally, the second message is an air interface message, for example, an RRC message.

In the foregoing technical solution, when the preset condition is met, the access network device notifies the user equipment that the first multicast session is to be released or is to be deactivated, so that the user equipment may feed back to the access network device that the user equipment is using or is about to use the first multicast session. In this way, the access network device determines, based on the feedback of the user equipment, whether to continue to release or deactivate the first multicast session. When user equipment in an idle state can receive multicast data, the multicast session can be properly managed.

With reference to the ninth aspect, in a possible implementation, the preset condition includes at least one of the following: no data is transmitted in the first multicast session within a second preset time period; there is no associated user equipment in a multicast group; or a first timer times out, where the first timer is used to monitor whether there is user equipment receiving data by using the first multicast session.

With reference to the ninth aspect or any one of the foregoing implementations, in another possible implementation, the transceiver unit is further configured to send a third message to a core network device, where the third message is used to request to release or deactivate the first multicast session.

With reference to the ninth aspect or any one of the foregoing implementations, in another possible implementation, the transceiver unit is configured to send the third message to the core network device after the first preset time period.

In the foregoing technical solution, the access network device requests the core network device to release or deactivate the first multicast session after the first preset time period. In other words, the access network device requests the core network device to release or deactivate the first multicast session only after determining to release or deactivate the first multicast session. In this way, implementation of the core network device is simple.

With reference to the ninth aspect or any one of the foregoing implementations, in another possible implementation, the transceiver unit is configured to send the third message to the core network device before the first preset time period.

In the foregoing technical solution, before determining whether to release or deactivate the first multicast session, the access network device requests the core network device in advance to release or deactivate the first multicast session. In this way, a delay of releasing or deactivating the first multicast session can be reduced.

With reference to the ninth aspect or any one of the foregoing implementations, in another possible implementation, the transceiver unit is further configured to: if the second message is received within the first preset time period, send a fifth message to the core network device, where the fifth message is used to request the core network device to retain the first multicast session.

In the foregoing technical solution, when the access network device has requested the core network device to release or deactivate the first multicast session, if the access network device receives the second message within the first preset time period, the access network device may notify the core network device of retaining the first multicast session, to prevent the core network device from releasing the first multicast session.

With reference to the ninth aspect or any one of the foregoing implementations, in another possible implementation, the second message is from the user equipment.

With reference to the ninth aspect or any one of the foregoing implementations, in another possible implementation, the second message is an RRC message.

According to a tenth aspect, this application provides a communication apparatus. The apparatus includes:

a transceiver unit, configured to receive a first message from an access network device, where the first message is used to notify that a first multicast session is to be released or is to be deactivated; and if the first multicast session is being used or is to be used, send, to the access network device, a second message that responds to the first message.

Optionally, the second message may be used to: request or notify to release or deactivate the first multicast session, indicate that data is being or is to be received by using the first multicast session, only respond to the first message (in this case, the user equipment may not send a response message if the data is not received by using the first multicast session), request to establish an RRC connection and optionally carry information about an activated multicast session, and the like.

Optionally, the second message is an air interface message, for example, an RRC message.

Optionally, the communication apparatus is user equipment.

In the foregoing technical solution, the access network device may notify the user equipment that the first multicast session is to be released or is to be deactivated. If the user equipment is using or is about to use the first multicast session, the user equipment may feed back to the access network device that the user equipment is using or is about to use the first multicast session. In this way, the access network device determines, based on the feedback of the user equipment, whether to continue to release or deactivate the first multicast session. When user equipment in an idle state can receive multicast data, the multicast session can be properly managed.

With reference to the tenth aspect, in a possible implementation, the user equipment is in an idle state or an RRC inactive state.

With reference to the tenth aspect or any one of the foregoing implementations, in another possible implementation, the air interface message is an RRC message.

According to an eleventh aspect, this application provides a communication apparatus. The apparatus includes:

a transceiver unit, configured to receive a third message from an access network device, where the third message is used to request to release or deactivate a first multicast session; and a processing unit, configured to release or deactivate the first multicast session based on the third message.

Optionally, the communication apparatus may be a core network device.

In the foregoing technical solution, when receiving the request from the access network device, the core network device may release or deactivate the first multicast session. When user equipment in an idle state can receive multicast data, the multicast session can be properly managed.

According to a twelfth aspect, this application provides a communication apparatus. The apparatus includes:

a transceiver unit, configured to receive a third message from an access network device, where the third message is used to request to release or deactivate a first multicast session; and a processing unit, configured to: if no fifth message received within a third preset time period, release or deactivate the first multicast session; and/or if the fifth message is received within the third preset time period, retain the first multicast session, where the fifth message indicates to retain the first multicast session.

Optionally, the communication apparatus may be a core network device.

In the foregoing technical solution, when the access network device has requested the core network device to release or deactivate the first multicast session, if the access network device receives the second message within the first preset time period, the access network device may notify the core network device of retaining the first multicast session. When user equipment in an idle state can receive multicast data, the multicast session can be properly managed.

According to a thirteenth aspect, this application provides a communication apparatus. The apparatus includes:

a transceiver unit, configured to broadcast a sixth message when a preset condition is met, where the sixth message is used to notify that a first multicast session is to be released or is to be deactivated; and a processing unit, configured to: if no eighth message is received from a core network device within a first preset time period, release or deactivate the first multicast session; and/or if an eighth message is received from a core network device within a first preset time period, retain the first multicast session, where the eighth message is used by user equipment to request to join the first multicast session.

Optionally, the communication apparatus may be an access network device.

The preset condition may be used to release or deactivate the first multicast session.

The releasing or deactivating the first multicast session may be understood as releasing or deactivating a context of the first multicast session.

The retaining the first multicast session may also be described as not releasing or deactivating the first multicast session, or giving up releasing or giving up deactivating the first multicast session.

Optionally, the eighth message may be used to: request or notify to release or deactivate the first multicast session, indicate that data is being or is to be received by using the first multicast session, only respond to the sixth message (in this case, the user equipment may not send a response message if the data is not received by using the first multicast session), and the like.

Optionally, the eighth message may be an N2 message.

In the foregoing technical solution, when the preset condition is met, the access network device notifies the user equipment that the first multicast session is to be released or is to be deactivated, so that the user equipment may feed back to the core network device that the user equipment is using or is about to use the first multicast session, and then the core network device feeds back, to the access network device, that the user equipment is still using or is about to use the first multicast session. In this way, the access network device determines, based on the feedback of the user equipment, whether to continue to release or deactivate the first multicast session. When user equipment in an idle state can receive multicast data, the multicast session can be properly managed.

With reference to the thirteenth aspect, in a possible implementation, the preset condition includes at least one of the following: no data is transmitted in the first multicast session within a second preset time period; there is no associated user equipment in a multicast group; or a first timer times out, where the first timer is used to monitor whether there is user equipment receiving data by using the first multicast session.

With reference to the thirteenth aspect or any one of the foregoing implementations, in another possible implementation, the transceiver unit is further configured to send a ninth message to the core network device before the first preset time period, where the ninth message is used to request to release or deactivate the first multicast session.

In the foregoing technical solution, before determining whether to release or deactivate the first multicast session, the access network device requests the core network device in advance to release or deactivate the first multicast session. In this way, a delay of releasing or deactivating the first multicast session can be reduced.

With reference to the thirteenth aspect or any one of the foregoing implementations, in another possible implementation, the transceiver unit is further configured to: if no eighth message is received within the first preset time period, send a ninth message to the core network device, where the ninth message is used to request to release or deactivate the first multicast session.

In the foregoing technical solution, the access network device requests the core network device to release or deactivate the first multicast session after the first preset time period. In other words, the access network device requests the core network device to release or deactivate the first multicast session only after determining to release or deactivate the first multicast session. In this way, implementation of the core network device is simple.

According to a fourteenth aspect, this application provides a communication apparatus. The apparatus includes:

a transceiver unit, configured to receive a sixth message from an access network device, where the sixth message is used to notify that a first multicast session is to be released or is to be deactivated; and if data is being received or is to be received by using the first multicast session, send a seventh message to a core network device, where the seventh message is used to request to join the first multicast session.

Optionally, the seventh message may be used to: request or notify to release or deactivate the first multicast session, indicate that data is being or is to be received by using the first multicast session, only respond to the sixth message (in this case, the user equipment may not send a response message if the data is not received by using the first multicast session), and the like.

Optionally, the seventh message is an NAS message.

Optionally, the communication apparatus may be user equipment.

In the foregoing technical solution, the access network device may notify the user equipment that the first multicast session is to be released or is to be deactivated. If the user equipment is using or is about to use the first multicast session, the user equipment may feed back to the core network device that the user equipment is using or is about to use the first multicast session. In this way, the access network device determines, based on the feedback of the user equipment, whether to continue to release or deactivate the first multicast session. When user equipment in an idle state can receive multicast data, the multicast session can be properly managed.

According to a fifteenth aspect, this application provides a communication apparatus. The apparatus includes:

a transceiver unit, configured to receive a seventh message from user equipment, where the seventh message is used to request to join a first multicast session; and send an eighth message to an access network device, where the eighth message is used to request to add the user equipment to the first multicast session.

Optionally, the communication apparatus may be a core network device.

Optionally, the seventh message and the eighth message may be used to: request or notify to release or deactivate the first multicast session, indicate that data is being or is to be received by using the first multicast session, only respond to the sixth message (in this case, the user equipment may not send a response message if the data is not received by using the first multicast session), and the like.

Optionally, the seventh message is an NAS message.

Optionally, the eighth message is an N2 message.

In the foregoing technical solution, if the user equipment is using or is about to use the first multicast session, the user equipment may feed back to the core network device that the user equipment is using or is about to use the first multicast session, and the core network device may feed back to the access network device that the user equipment still uses the first multicast session. In this way, the access network device determines, based on the feedback of the user equipment, whether to continue to release or deactivate the first multicast session. When user equipment in an idle state can receive multicast data, the multicast session can be properly managed.

According to a sixteenth aspect, this application provides a communication apparatus. The apparatus includes:

a transceiver unit, configured to receive a ninth message from an access network device, where the ninth message is used to request to release or deactivate a first multicast session; and a processing unit, configured to: if no seventh message is received from user equipment within a second preset time period, release or deactivate the first multicast session; and/or if a seventh message from user equipment is received within a second preset time period, retain the first multicast session. The processing unit is further configured to send an eighth message to the access network device, the eighth message is used to request to add the user equipment to the first multicast session, and the seventh message is used to request to join the first multicast session.

Optionally, the communication apparatus may be a core network device.

In the foregoing technical solution, after receiving the seventh message, the core network device may learn, based on the seventh message, that the user equipment is still using or is about to use the first multicast session, to determine that the first multicast session should be retained, and request the access network device to add the user equipment to the first multicast session. In this way, the access network device determines, based on the feedback of the user equipment, whether to continue to release or deactivate the first multicast session. When user equipment in an idle state can receive multicast data, the multicast session can be properly managed.

According to a seventeenth aspect, this application provides a communication apparatus, including a processor. The processor is coupled to the memory, and may be configured to execute instructions in the memory, so that the apparatus performs the method provided in any one of the first aspect to the eighth aspect, or performs the method in any possible implementation of the first aspect to the eighth aspect. Optionally, the apparatus further includes the memory. Optionally, the apparatus further includes an interface circuit, and the processor is coupled to the interface circuit.

According to an eighteenth aspect, this application provides a processor, including: an input circuit, an output circuit, and a processing circuit. The processing circuit is configured to: receive a signal by using the input circuit, and transmit a signal by using the output circuit, so that the processor performs the method provided in any one of the first aspect to the eighth aspect, or performs the method in any possible implementation of the first aspect to the eighth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a nineteenth aspect, this application provides a processing apparatus, including a processor. The processor is coupled to a memory. The processor is configured to read instructions stored in the memory, receive a signal by using a receiver, and transmit a signal by using a transmitter, to perform the method provided in any one of the first aspect to the eighth aspect, or perform the method in any possible implementation of the first aspect to the eighth aspect. Optionally, the processing apparatus may further include the memory.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be separately disposed in different chips. A type of the memory and a manner in which the memory and the processor are disposed are not limited in this embodiment of this application.

The processing apparatus according to the nineteenth aspect may be a chip. The processor may be implemented by hardware or software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a twentieth aspect, this application provides a computer program product. The computer program product includes a computer program (which may also be referred to as code or instructions). When the computer program is run, the computer is enabled to perform the method provided in any one of the first aspect to the eighth aspect, or performing the method in any possible implementation of the first aspect to the eighth aspect.

According to a twenty-first aspect, this application provides a computer-readable medium. The computer-readable medium stores a computer program (which may also be referred to as code or instructions). When the computer-readable medium is run on a computer, the computer is enabled to perform the method provided in any one of the first aspect to the eighth aspect, or performing the method in any possible implementation of the first aspect to the eighth aspect.

According to a twenty-second aspect, this application provides a communication system, including at least one of the communication apparatuses provided in any one of the foregoing aspects or possible implementations of the foregoing aspects.

DESCRIPTION OF EMBODIMENTS

The following describes technical solutions of this application with reference to accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system, a new radio (NR) communication system, a satellite communication system, and a future mobile communication system.

Figure 1:
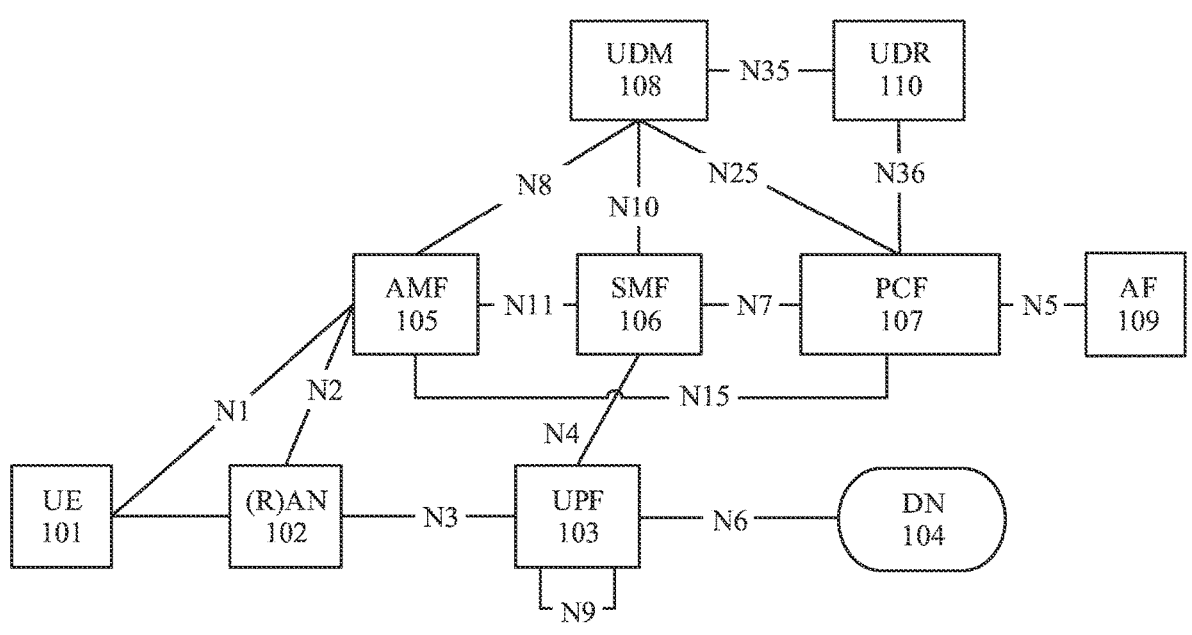
FIG. 1 is a schematic diagram of a network architecture.

FIG. 1 is a schematic diagram of a network architecture. Embodiments of this application may be applied to the network architecture. A 5G network architecture is used as an example. The network architecture includes: user equipment (UE) 101, a radio access network (RAN) device 102, a user plane function (user plane function, UPF) network element 103, a data network (DN) network element 104, an access and mobility management function (AMF) network element 105, a session management function (SMF) network element 106, a policy control function (PCF) network element 107, a unified data management (UDM) network element 108, an application function (AF) network element 109, and a unified data repository (UDR) network element 110. The user equipment 101, the radio access network device 102, the UPF network element 103, the DN network element 104, the AMF network element 105, the SMF network element 106, the PCF network element 107, the UDM network element 108, the AF network element 109, and the UDR network element 110 are respectively referred to as the UE 101, the RAN 102, the UPF 103, the DN 104, the AMF 105, the SMF 106, the PCF 107, the UDM 108, the AF 109, and the UDR 110 for short in the following.

The UE 101 mainly accesses a 5G network through a radio air interface and obtains a service. The UE 101 interacts with the RAN 102 through the air interface, and interacts with the AMF 105 in a core network by using NAS signaling.

The RAN 102 is responsible for scheduling an air interface resource for the UE 101 to access the network and responsible for air interface connection management.

The UPF 103 is responsible for processing user data in the user equipment, for example, forwarding and charging. For example, the UPF 103 may receive user data from the DN 104, and transmit the user data to the UE 101 by using the RAN 102, or may receive user data from the UE 101 by using the RAN 102, and forward the user data to the DN 104. A transmission resource and a scheduling function that are used by the UPF 103 to serve the UE 101 are managed and controlled by the SMF 106.

The DN 104 is an operator network that provides a data transmission service for a user, for example, an internet protocol (IP) multimedia service (IP multi-media service, IMS) or the internet. The UE 101 accesses the DN 104 by establishing a protocol data unit (PDU) session between the UE 101 and the RAN 102, the UPF 103, and the DN 104.

The AMF 105 is mainly responsible for mobility management in a mobile network, such as user location update, user network registration, and user handover.

The SMF 106 is mainly responsible for session management in the mobile network, such as session establishment, modification, and release. Specific functions include allocation of an IP address to a user, selection of a UPF that provides a packet forwarding function, and the like.

The PCF 107 is responsible for providing policies, such as a quality of service (QoS) policy or a slice selection policy, to the AMF 105 and the SMF 106.

The UDM 108 is configured to store user data such as subscription information and authentication/authorization information.

The AF 109 is mainly responsible for providing a service for a 3rd generation partnership project (3GPP) network, for example, affecting service routing and interacting with the PCF 107 to perform policy control.

The UDR 110 is responsible for storing and retrieving subscription data, policy data, common architecture data, and the like.

In the network architecture, N1 is an interface between the UE 101 and the AMF 105. N2 is an interface between the RAN 102 and the AMF 105, and is used to send an NAS message and the like. N3 is an interface between the RAN 102 and the UPF 103, and is used to transmit user plane data and the like. N4 is an interface between the SMF 106 and the UPF 103, and is used to transmit information such as tunnel identifier information, data buffer indication information, and a downlink data notification message that are of the N3 connection. N5 is an interface between the PCF 107 and the AF 109. The N6 interface is an interface between the UPF 103 and the DN 104, and is used to transmit user plane data and the like. N7 is an interface between the SMF 106 and the PCF 107. N8 is an interface between the AMF 105 and the UDM 108. N9 is an interface between UPFs. N10 is an interface between the UDM 108 and the SMF 106. N11 is an interface between the AMF 105 and the SMF 106. N15 is an interface between the AMF 105 and the PCF 107. N25 is an interface between the UDM 108 and PCF 107. N35 is an interface between the UDM 108 and the UDR 110. N36 is an interface between the UDR 110 and the PCF 107.

It should be noted that the interface between the network elements shown in FIG. 1 may alternatively be a servitized interface. This is not limited.

User equipment in embodiments of this application may also be referred to as a terminal device, a user, an access terminal, a subscriber unit, a subscriber station, a mobile station, a mobile console, a remote station, a remote terminal, a mobile device, a user terminal, a terminal, a wireless communication device, a user agent, a user apparatus, or the like. The user equipment may be a cellular phone, a smart watch, a wireless data card, a mobile phone, a tablet computer, a personal digital assistant (PDA) computer, a wireless modem, a handheld device, a laptop computer, a machine type communication (MTC) terminal, a computer with a wireless transceiver function, an internet of things terminal, a virtual reality terminal device, an augmented reality terminal device, a wireless terminal in industrial control, a wireless terminal in self driving, a wireless terminal in remote surgery, a wireless terminal in a smart grid, a wireless terminal in transportation security, a wireless terminal in a smart city, a wireless terminal in a smart home, a wireless terminal (for example, a satellite phone or a satellite terminal) in satellite communication, and the like. A specific technology and a specific device form that are used for the user device are not limited in embodiments of this application.

The access network device in embodiments of this application may be a device configured to communicate with the user device, and is mainly responsible for functions such as radio resource management, quality of service management, and data compression and encryption on an air interface side. The access network device may be a base transceiver station (BTS) in a global system for mobile communications (GSM) system or a code division multiple access (CDMA) system, a NodeB (NB) in a wideband code division multiple access (WCDMA) system, an evolved NodeB (eNB or eNodeB) in an LTE system, a base station in a worldwide interoperability for microwave access (WiMAX) communication system, a wireless controller in a cloud radio access network (CRAN) scenario, and a middle access point, a relay station, an in-vehicle device, a wearable device, or the like that is of a wireless high fidelity (wireless fidelity) system. Alternatively, the access network device may be a terminal that functions as a base station in D2D communication or machine-to-machine communication. Alternatively, the access network device may be a network device in a 5G network, a network device in a future evolved PLMN network, or the like. In addition, the access network device may alternatively be a module or unit that completes some functions of the base station, for example, may be a central unit (CU), or may be a distributed unit (DU). A specific technology and a specific device form that are used for the access network device are not limited in embodiments of this application.

It should be understood that a name of each network element shown in FIG. 1 is merely a name, and the name constitutes no limitation on a function of the network element. In different networks, the foregoing network elements may alternatively have other names. This is not specifically limited in embodiments of this application. For example, in a 6th generation (6G) network, some or all of the foregoing network elements may still use terms in 5G, or may have other names. A general description is provided herein. Details are not described again below. Similarly, interfaces between the network elements shown in FIG. 1 are merely an example. In a 5G network and another future network, interfaces between network elements may alternatively not be the interfaces shown in the figure. This is not limited in this application. It should be further understood that embodiments of this application are not limited to the architecture of the system shown in FIG. 1. For example, a communication system to which this application is applicable may include more or fewer network elements or devices. The devices or the network elements in FIG. 1 may be hardware, or may be software obtained through functional division or a combination of the hardware and the software. The devices or the network elements in FIG. 1 may communicate with each other via another device or network element.

It should be noted that multicast in embodiments of this application may be replaced with groupcast or broadcast. This is not limited.

If the 5G network needs to send data of same content to a plurality of user equipments, a multicast session may be established for the plurality of user equipments to transmit the data of same content, so that only one copy of the data of same content sent to the plurality of user equipments is sent. This helps improve utilization efficiency of the air interface resource and a core network resource.

It should be noted that the user equipment can receive multicast data by using the multicast session only when the user equipment is in a connected state. However, maintaining the connected state of the user equipment may occupy a storage resource and a scheduling resource of the access network device. Currently, public safety requires that one access network device can support multicast transmission of 800 users. As a result, the access network device may not meet the requirement.

Based on this, a solution in which the user equipment receives the multicast data by using the multicast session when the user equipment is in an idle state is provided. Specifically, when the user equipment enters the idle state from the connected state, the user equipment still stores a multicast receiving parameter when the user equipment is in the connected state, so that the user equipment in the idle state may receive the multicast data by using the multicast receiving parameter.

Generally, after the user equipment enters the idle state, the network side disassociates the user equipment from a multicast group. When there is no associated user equipment in the multicast group, the network side may release or deactivate a multicast session corresponding to the multicast group. When the user equipment in the idle state can receive the multicast data, and when the network side determines that there is no associated user equipment in a specific multicast group, it is possible that the user equipment in the idle state still receives data by using a multicast session corresponding to the multicast group. In this case, if the network side releases or deactivates the multicast session, transmission of the multicast data of the user equipment is affected. In this way, how to manage the multicast session becomes a problem urgently to be resolved.

For the foregoing problem, this application provides a communication method and a communication apparatus, to properly manage the multicast session when the user equipment in the idle state can receive the multicast data.

Figure 2:
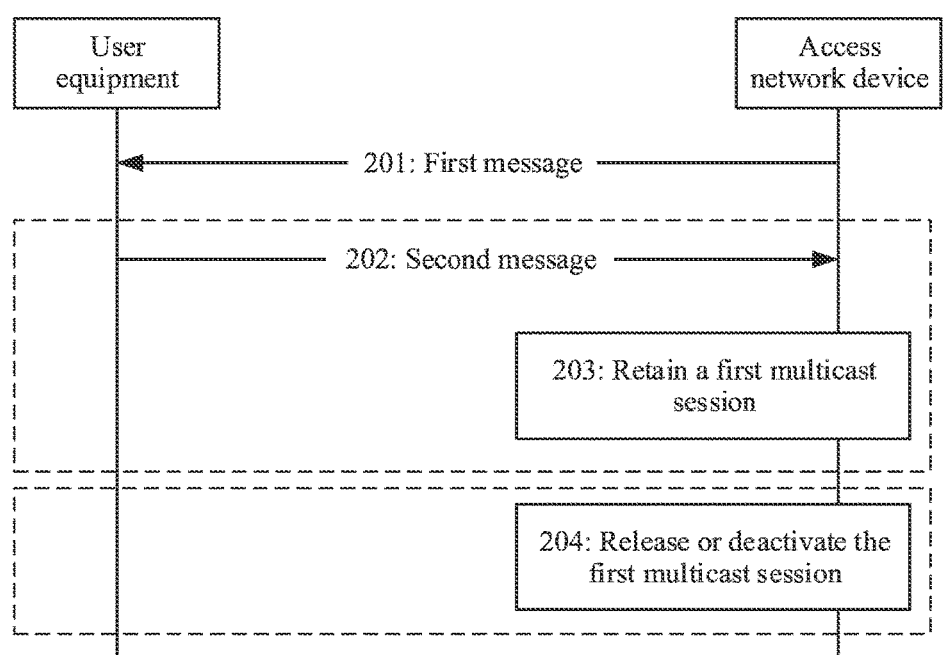
FIG. 2 is a schematic flowchart of a communication method according to this application.

FIG. 2 is a schematic flowchart of a communication method according to this application. The method shown in FIG. 2 may be applied to the system architecture shown in FIG. 1 and scenarios shown in FIG. 2. However, this embodiment of this application is not limited thereto.

The method in FIG. 2 may be performed by an access network device and user equipment, or may be performed by a module or unit in the access network device and the user equipment (for example, a circuit, a chip, or a system on chip (SOC)). In FIG. 2, an example in which the access network device and the user equipment are used as execution bodies is used. The method in FIG. 2 may include at least a part of the following content.

Step 201: The access network device sends a first message when a preset condition is met.

The first message may be used to notify that a first multicast session is to be released or is to be deactivated.

If the first multicast session is to be released or deactivated, it indicates that the first multicast session is not released or deactivated, but the first multicast session may be released or deactivated after a period of time. It is clear that a change of the first multicast session within this period of time (which may also be referred to as a buffer time) may also cause failure of release or deactivation of the first multicast session is not released or deactivated. For example, there is user equipment joining the first multicast session, or there is data to be transmitted. This is not limited.

In embodiments of this application, the releasing or deactivating the first multicast session may be understood as releasing or deactivating multicast context information corresponding to the first multicast session.

In some implementations, the preset condition may include at least one of the following (1), (2), and (3).

(1) No Data is Transmitted in the First Multicast Session within a Second Preset Time Period.

That no data is transmitted in the first multicast session within the second preset time period may be understood as: no user equipment receives multicast data by using the first multicast session within the second preset time period, a tunnel of the first multicast session is not occupied within the second preset time period, or the like.

(2) There is No Associated User Equipment in a Multicast Group.

That there is no associated user equipment in the multicast group may be understood as: there is no user equipment associated with the multicast group in the multicast group, there is no bound user equipment in the multicast group, a user list to which the first multicast session or the multicast group belongs is empty, the access network device has no context information about the user equipment in the multicast group, or the like. The multicast group herein is a multicast group corresponding to the first multicast session, and is referred to as a first multicast group below.

Specifically, the access network device may determine the unassociated user equipment in the first multicast group based on the following information: a last user equipment belonging to the first multicast group is handed over to another access network device, a last user equipment belonging to the first multicast group releases an AN connection, or the like.

For a procedure in which the user equipment releases the AN connection, refer to the related description in FIG. 5 below.

(3) A First Timer Times Out.

The first timer herein may be used to monitor whether there is user equipment receiving data by using the first multicast session.

For example, if the first timer times out, the access network device sends the first message. If some cases that may cause the first timer to stop timing occur, the access network device does not send the first message.

In an example, the first timer starts timing when the following situation occurs.

(a) There is no user equipment in the first multicast group (in other words, there is no user equipment currently in a connected state receives data by using the first multicast session).

(b) Alternatively, no data is transmitted in the first multicast session within the second preset time period.

It should be noted that there is no user equipment in the first multicast group may mean that there is no user equipment served by the access network device in the first multicast group.

The first timer stops timing when the following situation occurs.

(a) There is user equipment in the first multicast group (in other words, there is user equipment currently in a connected state receives multicast data by using the first multicast session).

(b) Alternatively, data is transmitted in the first multicast session.

It should be noted that there is user equipment in the first multicast group may mean that there is user equipment served by the access network device in the first multicast group.

When the first timer times out, the following operation may be triggered: the access network device sends the first message.

In another example, when the access network device detects that there is no associated user equipment in the first multicast group, the access network device may notify the user equipment that the first multicast session is to be released or is to be deactivated. If the user equipment feeds back to the access network device that the user equipment is receiving or is about to receive multicast data by using the first multicast session, the access network device may retain the first multicast session, and after receiving the feedback from the user equipment, start the first timer. When the first timer times out, the access network device may notify the user equipment again that the first multicast session is to be released or is to be deactivated, and determine, based on the feedback of the user equipment, whether to release or deactivate the first multicast session.

In this application, that the timer times out may also be described as that the timer expires, which is not distinguished.

In some implementations, that the preset condition is met may alternatively be replaced with that the access network device determines that the preset condition is satisfied. For example, the access network device sends the first message when the access network device determines that no data is transmitted in the first multicast session within the second preset time period, there is no associated user equipment in the first multicast group, or the first timer times out.

In some implementations, the access network device may broadcast the first message. For example, the access network device sends the first message in a system information broadcast (SIB) manner. For another example, the access network device broadcasts the first message by using a multicast-specific channel. In this case, the first message may include first information, and the first information may be information used to uniquely determine the first multicast session. Optionally, the first information may be one or more of the following information: an identifier of the first multicast session, a radio network temporary identity (G-RNTI) received by multicast corresponding to the first multicast session, an identifier of the first multicast group, a temporary mobile group identifier (TMGI) of the first multicast group, an IP address of an application server corresponding to the first multicast session, a service identifier (service ID) corresponding to the first multicast session, packet filter information corresponding to the first multicast session, a service data flow (SDF) identification rule corresponding to the first multicast session, ID information of an application (Application ID) corresponding to the first multicast session, target IP address information (IP multicast address) of multicast data of the first multicast session, context identifier information of the first multicast session (Multicast Session Context ID), and the like.

In some other implementations, the access network device may alternatively send the first message by using a multicast transmission resource corresponding to the first multicast session. For example, the first message is a special RRC message, and the message may be received by the user equipment in the first multicast group. In a possible manner, all user equipments in the first multicast group are configured with related configuration information for receiving the message (for example, after the user equipment sends a message used to request to join the first multicast group, the access network device or a core network device provides the configuration information to the user equipment). In this case, the first message may include the first information, or may not include the first information. This is not specifically limited.

Optionally, the first message may be a dedicated message used to release or deactivate the multicast session.

Optionally, the first message may also be a message used to collect statistics on currently received multicast data.

In this application, after receiving the first message, the user equipment may determine, based on whether the data is being received or is to be received by using the first multicast session, whether to send, to the access network device, a second message that responds to the first message.

Optionally, the second message may be used to: request or notify to release or deactivate the first multicast session, indicate that data is being or is to be received by using the first multicast session, only respond to the first message (in this case, the user equipment may not send a response message if the data is not received by using the first multicast session), request to establish an RRC connection and optionally carry information about an activated multicast session, and the like.

Optionally, the second message may be transmitted on a time domain resource and/or a frequency domain resource dedicated to multicast information transmission.

Optionally, the second message may be an air interface message. For example, the second message may be an RRC message.

Optionally, the second message may be a dedicated RRC message, for example, dedicated to notifying "the access network device that the user equipment is receiving or is about to receive the multicast data". The second message may include the foregoing first information, or the second message does not include the foregoing first information, and the first information is included in a subsequent RRC message.

Step 202: If the user equipment is receiving or is about to receive the data by using the first multicast session, the user equipment sends the second message to the access network device.

In a possible case, before receiving the first message, user equipment in an idle state or an RRC inactive state is receiving data by using the first multicast session or is receiving data of the first multicast session, and the user equipment sends the second message to the access network device after receiving the first message.

It should be noted that the user equipment may be in the idle state or the RRC inactive state.

Step 203: If the second message that responds to the first message is received within a first preset time period after the first message is sent, the access network device retains the first multicast session.

In other words, within the first preset time period, if the user equipment feeds back to the access network device that the user equipment is receiving or is about to receive the data by using the first multicast session, the access network device may retain the first multicast session.

If the user equipment does not receive the data by using the first multicast session, the user equipment may not send the second message to the access network device. That the user equipment does not receive data by using the first multicast session herein may be understood as: the user equipment does not currently receive the data by using the first multicast session, the user equipment does not receive the data by using the first multicast session in a future period of time, or the like.

Step 204: If no second message that responds to the first message is received within the first preset time period after the first message is sent, the access network device releases or deactivates the first multicast session.

In other words, within the first preset time period, if no user equipment feeds back to the access network device that the user equipment is receiving or is about to receive the data by using the first multicast session, the access network device considers that the first multicast session can be released or deactivated.

It should be noted that step 202 to step 204 are optional steps. For example, the method may include step 202 and step 203. For another example, the method may include step 204. For still another example, the method may also include step 202 to step 204.

For example, when the access network device broadcasts the first message, and receives, within the first preset time period, a second message that is from user equipment 1 and that responds to the first message, it indicates that the user equipment 1 is receiving or is about to receive data by using the first multicast session, and the access network device may retain the first multicast session, to ensure service transmission of the user equipment 1. It is clear that the access network device may further receive, from another user equipment, a second message that responds to the first message. This is not limited. Correspondingly, the user equipment in the idle state or the RRC inactive state may receive the data of the first multicast session by using a stored multicast receiving parameter of the first multicast session.

It should be noted that the retaining the first multicast session may also be described as not releasing or deactivating the first multicast session, or giving up releasing or giving up deactivating the first multicast session. This is not limited in this embodiment of this application.

In some implementations, after step 202, the method may further include: The access network device starts a first timer, and when the first timer expires, the access network device broadcasts the first message to the user equipment again, to notify that the first multicast session is to be released or is to be deactivated. Further, the access network device may determine, based on the feedback of the user equipment, whether to release or deactivate the first multicast session, that is, perform step 203 or step 204.

In the foregoing method, when the preset condition is met, the access network device notifies the user equipment that the first multicast session is to be released or is to be deactivated, so that the user equipment may feed back to the access network device whether the user equipment uses the first multicast session. In this way, the access network device determines, based on the feedback of the user equipment, whether to continue to release or deactivate the first multicast session. When the user equipment in the idle state can receive the multicast data, the multicast session can be properly managed.

Figure 3:
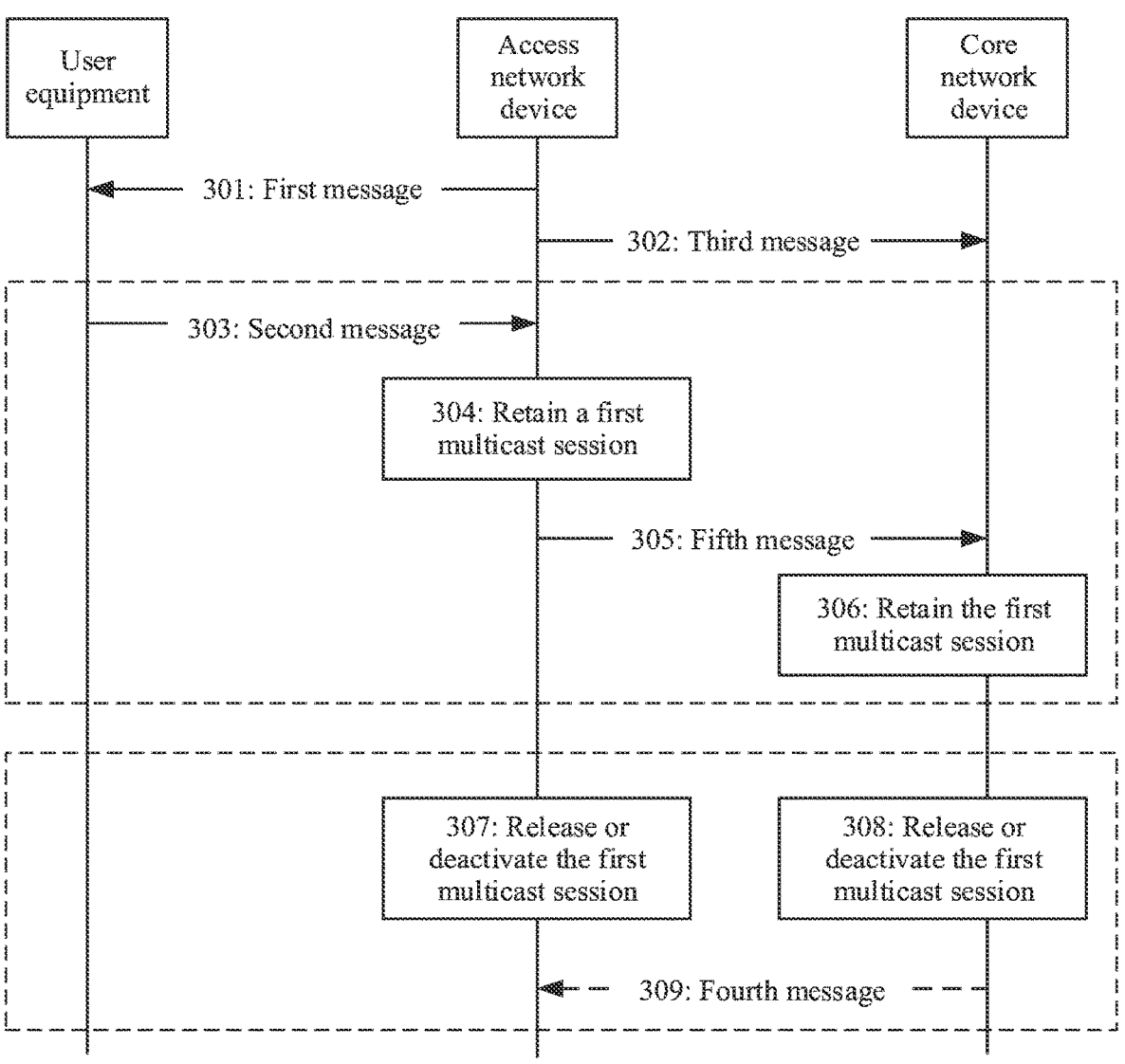
FIG. 3 is a schematic flowchart of another communication method according to this application.

FIG. 3 is a schematic flowchart of another communication method according to this application. The method in FIG. 3 may be performed by an access network device, a core network device, and user equipment, or may be performed by a module or unit in the access network device, the core network device, and the user equipment. In FIG. 3, an example in which the access network device, the core network device, and the user equipment are used as execution bodies is used. The method in FIG. 3 may include at least a part of the following content.

Step 301: The access network device broadcasts a first message when a preset condition is met.

The first message may be used to notify that a first multicast session is to be released or is to be deactivated.

For detailed descriptions of step 301, refer to step 201. Details are not described herein again.

Step 302: The access network device sends a third message to the core network device.

Correspondingly, the core network device receives the third message from the access network device.

The third message may be used to request to release or deactivate the first multicast session.

Optionally, the third message may be an N2 message. For example, the third message may be a UE context release message, a PDU session context modification request message, a PDU session context update request message, a PDU session release request message, or another dedicated message used to notify the core network device to release or deactivate the first multicast session (for example, a multicast session deactivation message, a multicast session release message, a multicast session modification message, or a multicast session update message).

Optionally, the third message may include the first information in step 201.

Step 303: If the user equipment is receiving or is about to receive data by using the first multicast session, the user equipment sends a second message to the access network device.

For detailed descriptions of step 303, refer to step 202. Details are not described herein again.

Step 304: If the second message that responds to the first message is received within a first preset time period after the third message is sent, the access network device retains the first multicast session.

Step 305: If the second message that responds to the first message is received within the first preset time period after the third message is sent, the access network device sends a fifth message to the core network device.

The fifth message may be used to indicate to retain the first multicast session.

Optionally, the fifth message may be an N2 message. For example, the fifth message may be a UE context release message, a PDU session context modification request message, a PDU session context update request message, a PDU session release request message, or another dedicated message used to indicate the core network device to retain the first multicast session (for example, a multicast session deactivation message, a multicast session release message, a multicast session modification message, or a multicast session update message).

Optionally, the fifth message may include the first information in step 201.

Step 306: If the fifth message is received within a third preset time period after the third message is received, the core network device retains the first multicast session.

If the user equipment does not receive the data by using the first multicast session, the user equipment may not send the second message to the access network device.

Step 307: If no second message that responds to the first message is received within the first preset time period after the third message is sent, the access network device releases or deactivates the first multicast session.

Step 308: If no fifth message is received within the third preset time period after the third message is received, the access network device releases or deactivates the first multicast session.

It should be noted that step 303 to step 308 are optional steps. For example, the method may include step 303 to step 306. For another example, the method may include step 307 and step 308. For still another example, the method may also include step 303 to step 308.

Optionally, after step 308, step 309 may be further performed.

Step 309: The core network device sends a fourth message to the access network device.

The fourth message may be used to indicate or notify the access network device that the core network device has released or deactivated the first multicast session.

Optionally, the fourth message may be a response message of the third message, for example, a UE context release response message, a PDU session context modification response message, a PDU session context update response message, a PDU session release response message, or another dedicated message (for example, a multicast session deactivation response message, a multicast session release response message, a multicast session modification response message, or a multicast session update response message).

Optionally, after step 303, the method may further include: The access network device starts a first timer, and periodically sends the first message to the user equipment, to notify the user equipment that the first multicast session is to be released or is to be deactivated. The foregoing step 302 to step 306 are repeated, or the foregoing step 302 and step 307 to step 309 are repeated.

In the foregoing method, the access network device sends the third message before the first preset time period. Before determining whether to release or deactivate the first multicast session, the access network device has requested the core network device to release or deactivate the first multicast session. Therefore, if the access network device receives the second message within the first preset time period after sending the third message, the access network device may notify the core network device of retaining the first multicast session, so that the core network device retains the first multicast session.

In the foregoing method, the access network device requests the core network device to release or deactivate the first multicast session before the first preset time period. In other words, the access network device requests the core network device to release or deactivate the first multicast session in advance without determining whether to release or deactivate the first multicast session. In this way, a delay of releasing or deactivating the first multicast session can be reduced.

Figure 4:
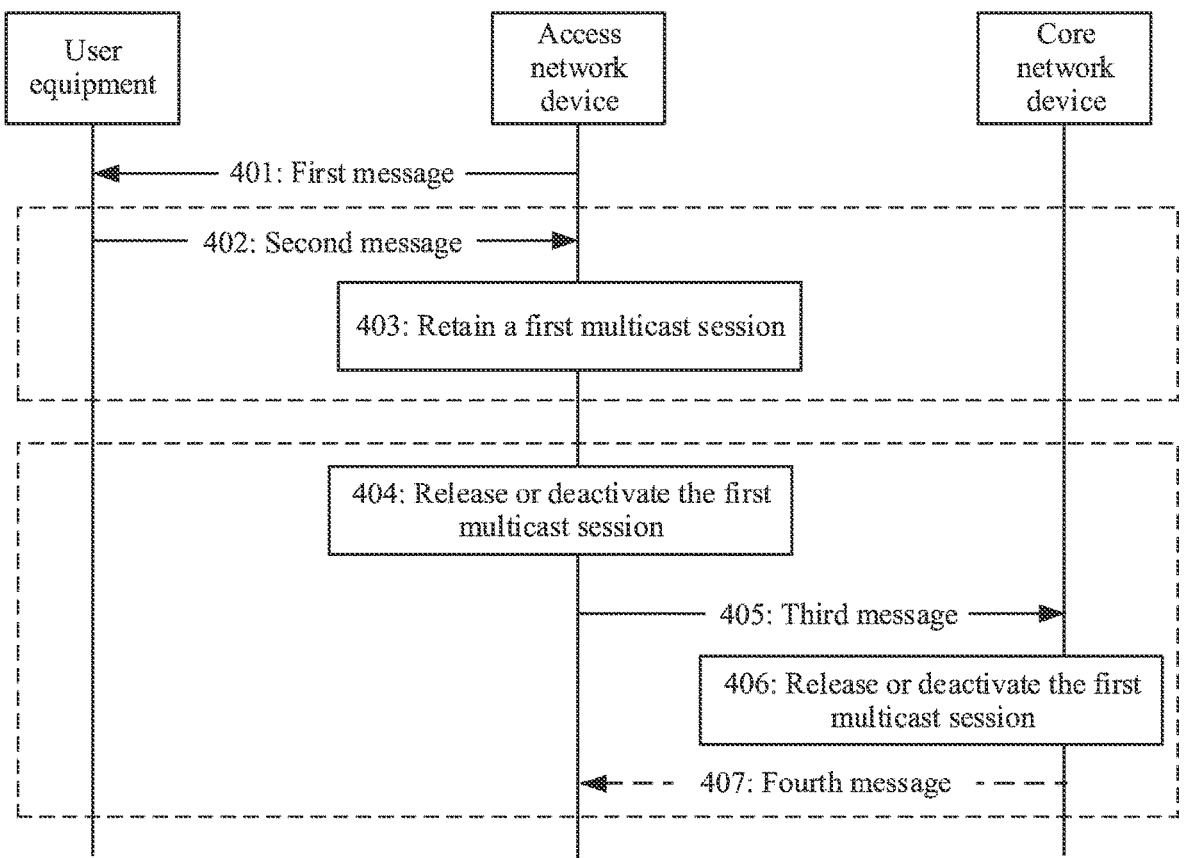
FIG. 4 is a schematic flowchart of another communication method according to this application.

FIG. 4 is a schematic flowchart of another communication method according to this application. The method in FIG. 4 may be performed by an access network device, a core network device, and user equipment, or may be performed by a module or unit in the access network device, the core network device, and the user equipment. In FIG. 4, an example in which the access network device, the core network device, and the user equipment are used as execution bodies is used. The method in FIG. 3 may include at least a part of the following content.

Step 401: The access network device broadcasts a first message when a preset condition is met.

The first message may be used to notify that a first multicast session is to be released or is to be deactivated.

For detailed descriptions of step 401, refer to step 201. Details are not described herein again.

Step 402: If the user equipment is receiving or is about to receive data by using the first multicast session, the user equipment sends a second message to the access network device.

For detailed descriptions of step 402, refer to step 202. Details are not described herein again.

Step 403: If the second message that responds to the first message is received within the first preset time period after the first message is sent, the access network device retains the first multicast session.

Because the access network device determines not to release or deactivate the first multicast session, the access network device may not send a message to the core network device to indicate the core network device to change.

If the user equipment does not receive the data by using the first multicast session, the user equipment may not send the second message to the access network device.

Step 404: If no second message that responds to the first message is received within the first preset time period after the first message is sent, the access network device releases or deactivates the first multicast session.

Step 405: The access network device sends a third message to the core network device.

The third message may be used to request to release or deactivate the first multicast session.

Optionally, the third message may be an N2 message. For example, the third message may be a UE context release message, a PDU session context modification request message, a PDU session context update request message, a PDU session release request message, or another dedicated message used to indicate the core network device to release or deactivate the first multicast session (for example, a multicast session deactivation message, a multicast session release message, a multicast session modification message, or a multicast session update message).

Optionally, the third message may include the first information in step 201.

Step 406: After the third message is received, the core network device releases or deactivates the first multicast session.

It should be noted that step 402 to step 406 are optional steps. For example, the method may include step 402 and step 403. For another example, the method may include step 404 to step 406. For still another example, the method may also include step 402 to step 406.

Optionally, after step 406, step 407 may be further performed.

Step 407: The core network device sends a fourth message to the access network device.

The fourth message may be used to indicate or notify the access network device that the core network device has released or deactivated the first multicast session.

Optionally, the fourth message may be a response message of the third message, for example, a UE context release response message, a PDU session context modification response message, a PDU session context update response message, a PDU session release response message, or another dedicated message (for example, a multicast session deactivation response message, a multicast session release response message, a multicast session modification response message, or a multicast session update response message).

Optionally, after receiving the second message, the method may further include: The access network device starts a first timer, and periodically sends the first message to the user equipment, to notify the user equipment that the first multicast session is to be released or is to be deactivated. Repeat the foregoing step 402 and step 403, or repeat the foregoing step 404 to step 406.

In the foregoing method, the access network device may send the third message to the core network device after the first preset time period. In other words, when the access network device has determined to release or deactivate the first multicast session, the access network device sends the third message to the core network device, to request the core network device to release or deactivate the first multicast session. In this case, after receiving the third message, the core network device releases or deactivates the first multicast session.

In the foregoing method, the access network device requests the core network device to release or deactivate the first multicast session after the first preset time period. In other words, the access network device requests the core network device to release or deactivate the first multicast session only after determining to release or deactivate the first multicast session. In this way, implementation of the core network device is simple.

In addition, it should be further noted that the access network device may alternatively send the third message to the core network device within the first preset time period.

Figure 5:
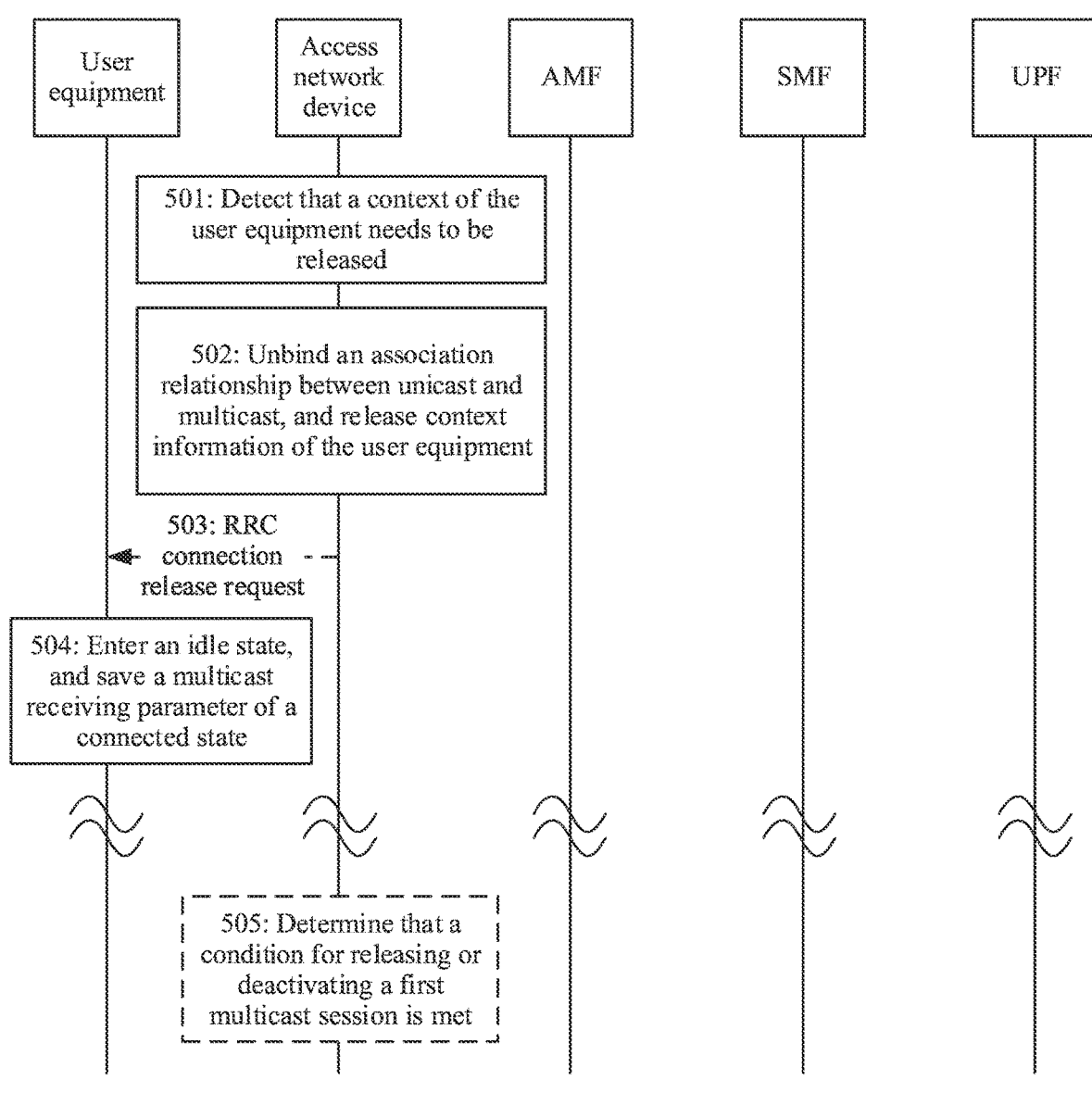
FIG. 5 is a schematic flowchart of releasing an access network (AN) connection by user equipment.

The following describes a procedure in which the user equipment releases an AN connection with reference to FIG. 5.

FIG. 5 is a schematic flowchart of releasing the AN connection by the user equipment. FIG. 5 briefly describes only the procedure of releasing the AN connection. For specific details, refer to the conventional technology.

Step 501: An access network device detects that a condition for releasing a context of the user equipment is met.

For example, when the access network device detects that no unicast signaling or data of specific user equipment is transmitted within a period of time (or may be described as that a user inactivity timer expires), the access network device triggers release of context information of the user equipment.

Step 502: The access network device unbinds or releases an association relationship between unicast and multicast of the user equipment, and releases the context information of the user equipment.

It may be understood that the access network device considers that the user equipment does not continue to receive multicast data of a first multicast session.

It should be noted that the association relationship between unicast and multicast of the user equipment may also be described as an association relationship between a unicast session of the user equipment and the first multicast session, an association relationship between the user equipment and a first multicast group, and the like. For ease of description, the association relationship between unicast and multicast of the user equipment is described in the following.

In some implementations, the context information of the user equipment includes multicast information (for example, the context information of the user equipment includes information about the first multicast group). In this way, when the access network device deletes the context information of the user equipment, it may be considered that the access network device unbinds or releases the association relationship between unicast and multicast of the user equipment.

Optionally, in this implementation, the access network device may not store information about a list of user equipments that receive data corresponding to the multicast group (for ease of description, referred to as information about the user equipment list in the following).

In some other implementations, the context information of the user equipment does not include multicast information, and the access network device separately stores information about a user equipment list. In this case, the access network device may delete the context information of the user equipment, and further delete the user equipment from the information about the user equipment list.

Optionally, the information about the user equipment list may be in the following format.

TABLE 1

Multicast context
Multicast identifier (ID)
QoS configuration information
User equipment list after the current user equipment is deleted Step 503: The access network device sends an RRC connection release request message to the user equipment.

Correspondingly, the user equipment receives the RRC connection release request message from the access network device.

Step 504: The user equipment enters an idle state, and saves a multicast receiving parameter of a connected state.

Optionally, the multicast receiving parameter includes one or more of the following parameters.

(a) G-RNTI received by multicast (b) Bandwidth part (BPW) configuration information corresponding to a service: When receiving the service, the user equipment determines, based on the BPW configuration, a subcarrier spacing (SCS), a frequency domain location, and a cyclic prefix (CP) length that correspond to the BPW. The BPW configuration information further includes COREST configuration information for physical downlink control channel (PDCCH) detection, and the COREST configuration information indicates a time-frequency resource on which the PDCCH is located when G-RNTI detection is performed.

(c) Physical downlink control channel (PDSCH) scrambling sequence of a service: When decoding the PDSCH of the service, the user equipment performs descrambling based on the sequence.

(d) Discontinuous reception (DRX) parameter of the G-RNTI: The user equipment performs G-RNTI detection based on the DRX parameter.

(e) Demodulation reference signal configuration: The user equipment demodulates, based on the reference signal configuration, a PDSCH scheduled by the G-RNTI.

(f) Rate matching reference signal information

As user equipment continuously joins or leaves the first multicast group, the user equipment associated with the first multicast group changes. When detecting that there is no associated user equipment in the first multicast group, the access network device may perform step 505.

Step 505: The access network device determines that a condition for releasing or deactivating the first multicast session is met.

When determining that the condition for releasing or deactivating the first multicast session is met, the access network device may trigger to send the first message and subsequent steps (for example, step 202 to step 204 shown in FIG. 2, step 302 to step 309 shown in FIG. 3, and step 402 to step 407 shown in FIG. 4).

In the methods shown in FIG. 2 to FIG. 4, the user equipment feeds back, to the access network device by using an air interface message, whether the data is being or is to be received by using the first multicast session. In some methods, the user equipment may further feed back, to the access network device by using the core network device, whether the data is being received or is to be received by using the first multicast session. The following describes the method with reference to FIG. 6 to FIG. 8.

Figure 6:
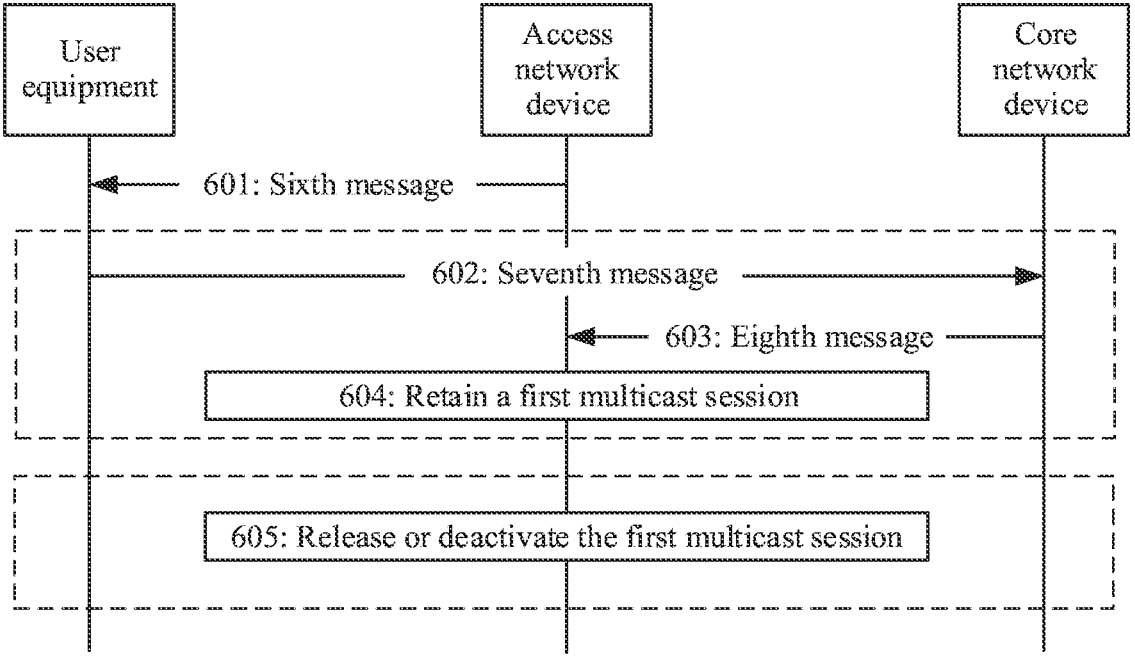
FIG. 6 is a schematic flowchart of another communication method according to this application.

FIG. 6 is a schematic flowchart of another communication method according to this application. The method shown in FIG. 6 may be applied to the system architecture shown in FIG. 1 and scenarios shown in FIG. 2. However, this embodiment of this application is not limited thereto.

The method in FIG. 6 may be performed by an access network device and user equipment, or may be performed by a module or unit in the access network device and the user equipment (for example, a circuit, a chip, an SOC). In FIG. 6, an example in which the access network device and the user equipment are used as execution bodies is used. The method in FIG. 6 may include at least a part of the following content.

Step 601: The access network device sends a sixth message when a preset condition is met.

The sixth message may be used to notify that a first multicast session is to be released or is to be deactivated.

For an implementation of step 601, refer to step 201. Details are not described herein again. The sixth message may be the same as the first message.

In the method shown in FIG. 6, after receiving the sixth message, the user equipment may determine whether data is being received or is to be received by using the first multicast session and fed back the data to the access network device. Different from FIG. 2 to FIG. 4, the user equipment feeds back, to the access network device by using the core network device, that the data is being received or is to be received by using the first multicast session.

Step 602: If the user equipment is receiving or is about to receive the data by using the first multicast session, the user equipment sends a seventh message to the core network device.

In a possible case, before receiving the sixth message, user equipment in an idle state or an RRC inactive state is receiving data by using the first multicast session or is receiving data of the first multicast session, and the user equipment sends the seventh message to the core network device after receiving the sixth message.

The seventh message may be used to: request or notify to release or deactivate the first multicast session, indicate that data is being or is to be received by using the first multicast session, only respond to the sixth message (in this case, the user equipment may not send a response message if the data is not received by using the first multicast session), request to establish an RRC connection and optionally carry information about an activated multicast session, and the like.

Optionally, the seventh message may be a service request message, a PDU session modification request message, or an uplink NAS transport message.

Optionally, the seventh message may include the first information.

Step 603: After receiving the seventh message, the core network device sends an eighth message to the access network device.

The eighth message may be used to: request or notify to release or deactivate the first multicast session, indicate that data is being or is to be received by using the first multicast session, only respond to the sixth message (in this case, the user equipment may not send a response message if the data is not received by using the first multicast session), request to establish an RRC connection and optionally carry information about an activated multicast session, and the like.

Optionally, the eighth message may be an N2 message.

Step 604: If the eighth message is received within a first preset time period after the sixth message is sent, the access network device retains the first multicast session.

If the user equipment does not receive the data by using the first multicast session, the user equipment may not send the seventh message to the core network device.

Step 605: If no eighth message is received within the first preset time period after the sixth message is sent, the access network device releases or deactivates the first multicast session.

In other words, within the first preset time period, if no user equipment feeds back to the access network device that the user equipment is receiving or is about to receive the data by using the first multicast session, the access network device considers that the first multicast session can be released or deactivated.

It should be noted that step 602 to step 605 are optional steps. For example, the method may include step 602 to step 604. For another example, the method may include step 605. For still another example, the method may also include step 602 to step 605.

It should be further noted that only the message received and the message sent by the core network device are described above, and message interaction between the core network devices is not limited. For example, the core network device includes an AMF and an SMF. The AMF may receive the seventh message. After receiving the seventh message, the AMF may send an N11 message to the SMF to transmit, to the SMF, information carried in the seventh message. Then, the SMF sends the eighth message to the access network device.

For example, when the access network device broadcasts the sixth message, and receives an eighth message for the user equipment 1 within the first preset time period, it indicates that the user equipment 1 is receiving or is about to receive data by using the first multicast session, and the access network device may retain the first multicast session, to ensure service transmission of the user equipment 1. It is clear that the access network device may further receive an eighth message for another user equipment. This is not limited. Correspondingly, the user equipment in the idle state or the RRC inactive state may receive the data of the first multicast session by using a stored multicast receiving parameter of the first multicast session.

It should be noted that the retaining the first multicast session may also be described as not releasing or deactivating the first multicast session, or giving up releasing or giving up deactivating the first multicast session. This is not limited in this embodiment of this application.

In some implementations, after step 603, the method may further include: The access network device starts a first timer, and when the first timer expires, the access network device broadcasts the sixth message to the user equipment again, to notify that the first multicast session is to be released or is to be deactivated. Further, the access network device may determine, based on the feedback of the user equipment, whether to release or deactivate the first multicast session, that is, perform step 604 or step 605.

In embodiments of this application, the releasing or deactivating the first multicast session may be understood as releasing or deactivating multicast context information corresponding to the first multicast session.

In the foregoing method, when the preset condition is met, the access network device notifies the user equipment that the first multicast session is to be released or is to be deactivated, so that the user equipment may feed back to the core network device that the user equipment is using or is about to use the first multicast session, and then the core network device feeds back, to the access network device, that the user equipment still uses the first multicast session. In this way, the access network device determines, based on the feedback of the user equipment, whether to continue to release or deactivate the first multicast session. When user equipment in an idle state can receive multicast data, the multicast session can be properly managed.

Figure 7:
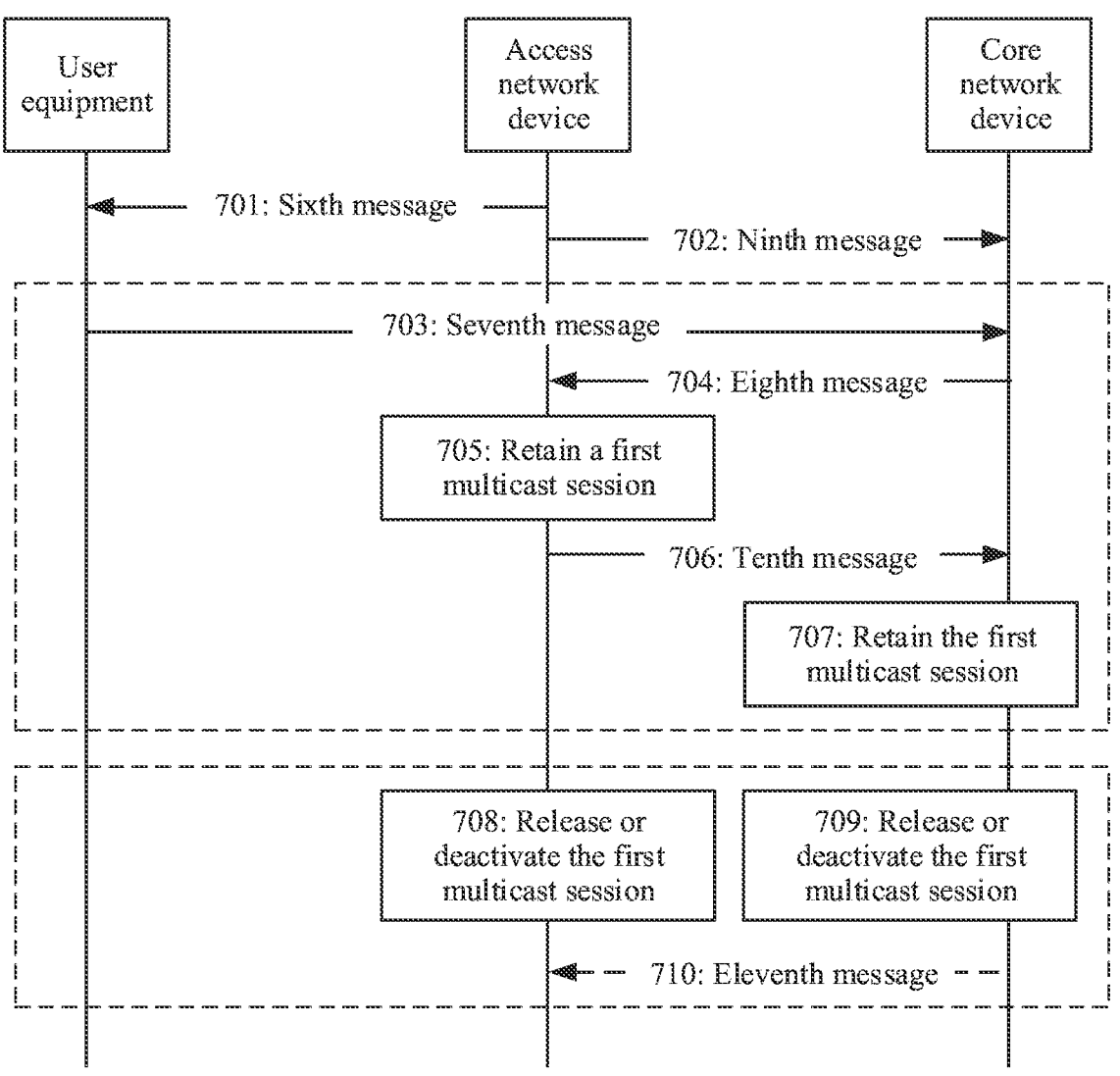
FIG. 7 is a schematic flowchart of another communication method according to this application.

FIG. 7 is a schematic flowchart of another communication method according to this application. The method in FIG. 7 may be performed by an access network device, a core network device, and user equipment, or may be performed by a module or unit in the access network device, the core network device, and the user equipment. In FIG. 7, an example in which the access network device, the core network device, and the user equipment are used as execution bodies is used. The method in FIG. 7 may include at least a part of the following content.

Step 701: The access network device broadcasts a sixth message when a preset condition is met.

The sixth message may be used to notify that a first multicast session is to be released or is to be deactivated.

For detailed descriptions of step 701, refer to step 601. Details are not described herein again.

Step 702: The access network device sends a ninth message to the core network device.

Correspondingly, the core network device receives the ninth message from the access network device.

The ninth message may be used to request to release or deactivate the first multicast session.

The ninth message may be the third message described above.

Step 703: If the user equipment is receiving or is about to receive data by using the first multicast session, the user equipment sends a seventh message to the core network device.

For detailed descriptions of step 703, refer to step 602. Details are not described herein again.

Step 704: After receiving the seventh message, the core network device sends an eighth message to the access network device.

For detailed descriptions of step 704, refer to step 603. Details are not described herein again.

Step 705: If the eighth message is received within a first preset time period after the ninth message is sent, the access network device retains the first multicast session.

Step 706: If the eighth message is received within the first preset time period after the ninth message is sent, the access network device sends a tenth message to the core network device.

The tenth message may be used to indicate to retain the first multicast session.

The tenth message may be the fifth message described above.

Step 707: If the tenth message is received within a third preset time period after the ninth message is received, the core network device retains the first multicast session.

If the user equipment does not receive the data by using the first multicast session, the user equipment may not send the seventh message to the access network device.

Step 708: If no eighth message is received within the first preset time period after the ninth message is sent, the access network device releases or deactivates the first multicast session.

Step 709: If no tenth message is received within a third preset time period after the ninth message is received, the core network device releases or deactivates the first multicast session.

It should be noted that step 703 to step 709 are optional steps. For example, the method may include step 703 to step 707. For another example, the method may include step 708 and step 709. For still another example, the method may also include step 703 to step 709.

Optionally, after step 709, step 710 may be further performed.

Step 710: The core network device sends an eleventh message to the access network device.

The eleventh message may be used to indicate or notify the access network device that the core network device has released or deactivated the first multicast session. The eleventh message may be the fourth message described above.

Optionally, after step 704, the method may further include: The access network device starts a first timer, and periodically sends the sixth message to the user equipment, to notify the user equipment that the first multicast session is to be released or is to be deactivated. Repeat the foregoing step 702 to step 707, or repeat the foregoing step 702 and step 708 to step 710.

In the foregoing method, the access network device sends the ninth message before the first preset time period. Before determining whether to release or deactivate the first multicast session, the access network device has requested the core network device to release or deactivate the first multicast session. Therefore, if the access network device receives the eighth message within the first preset time period, the access network device may notify the core network device of retaining the first multicast session. If no tenth message sent by the access network device is received within the third preset time period after the ninth message is received, the core network device considers that the first multicast session may be released or deactivated.

It should be noted that, in some other implementations, step 707 may also be performed before step 705, that is, after receiving the seventh message, the core network device may learn, based on the seventh message, that the user equipment is still using or is about to use the first multicast session, to determine that the first multicast session should be retained. In this case, step 706 may not be performed.

In the foregoing method, the access network device requests the core network device to release or deactivate the first multicast session before the first preset time period. In other words, the access network device requests the core network device to release or deactivate the first multicast session in advance without determining whether to release or deactivate the first multicast session. In this way, a delay of releasing or deactivating the first multicast session can be reduced.

Figure 8:
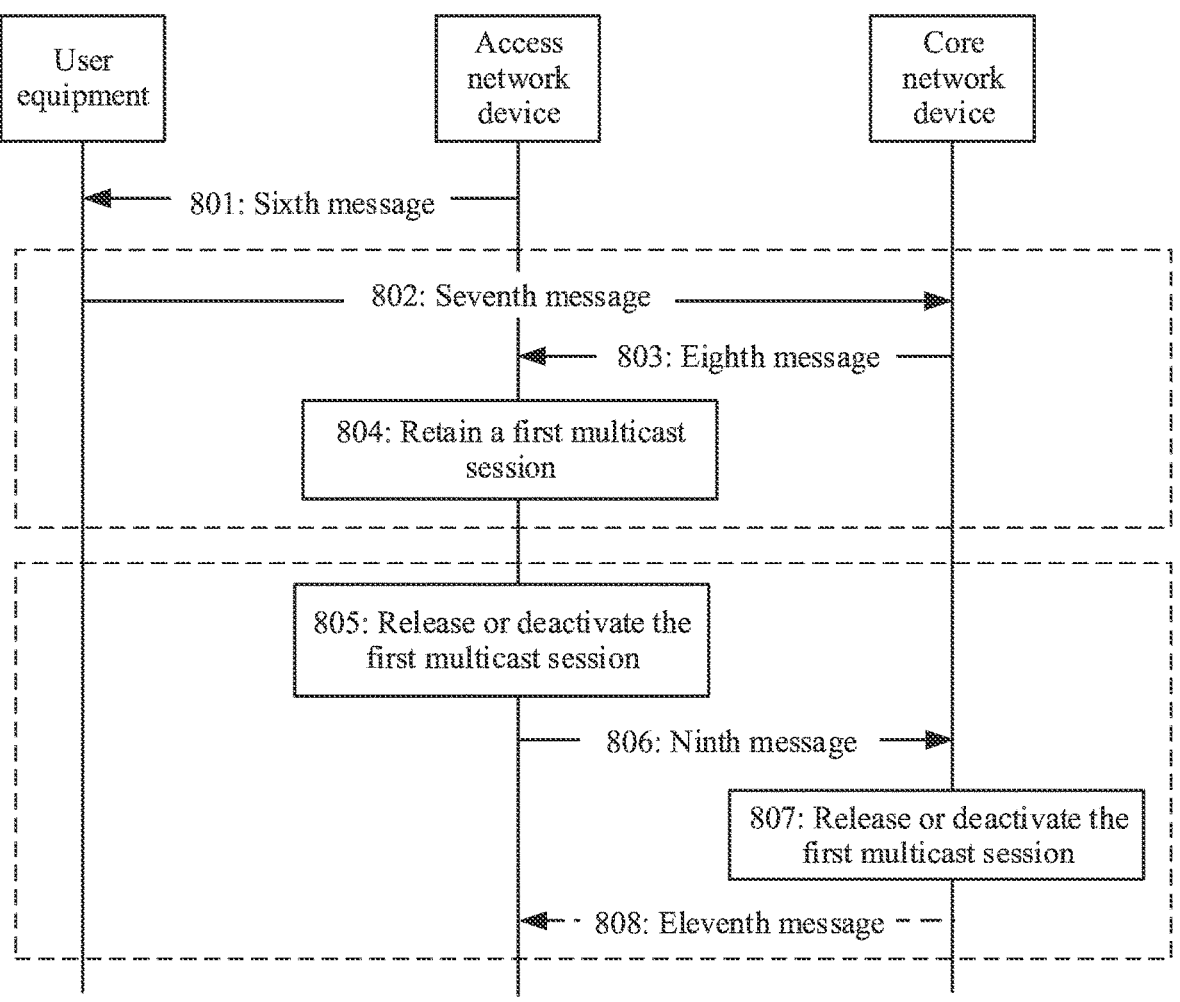
FIG. 8 is a schematic flowchart of another communication method according to this application.

FIG. 8 is a schematic flowchart of another implementation of a communication method according to an embodiment of this application. The method in FIG. 8 may be performed by an access network device, a core network device, and user equipment, or may be performed by a module or unit in the access network device, the core network device, and the user equipment. In FIG. 8, an example in which the access network device, the core network device, and the user equipment are used as execution bodies is used. The method in FIG. 8 may include at least a part of the following content.

Step 801: The access network device broadcasts a sixth message when a preset condition is met.

The sixth message may be used to notify that a first multicast session is to be released or is to be deactivated.

For detailed descriptions of step 801, refer to step 601. Details are not described herein again.

Step 802: If the user equipment is receiving or is about to receive data by using the first multicast session, the user equipment sends a seventh message to the core network device.

For detailed descriptions of step 802, refer to step 602. Details are not described herein again.

Step 803: After receiving the seventh message, the core network device sends an eighth message to the access network device.

For detailed descriptions of step 803, refer to step 603. Details are not described herein again.

Step 804: If the eighth message is received within a first preset time period after the sixth message is sent, the access network device retains the first multicast session.

Because the access network device determines not to release or deactivate the first multicast session, the access network device may not send a message to the core network device to indicate the core network device to change.

Step 805: If no eighth message is received within the first preset time period after the sixth message is sent, the access network device releases or deactivates the first multicast session.

Step 806: If no eighth message is received within the first preset time period after the sixth message is sent, the access network device sends a ninth message to the core network device.

The ninth message may be used to request to release or deactivate the first multicast session. The ninth message may be the third message described above.

Step 807: If the ninth message is received, the core network device releases or deactivates the first multicast session.

It should be noted that step 802 to step 807 are optional steps. For example, the method may include step 802 to step 804. For another example, the method may include step 805 to step 807. For still another example, the method may also include step 802 to step 807.

Optionally, after step 807, step 808 may be further performed.

Step 808: The core network device sends an eleventh message to the access network device.

The eleventh message may be used to indicate or notify the access network device that the core network device has released or deactivated the first multicast session. The eleventh message may be the fourth message described above.

Optionally, after step 803, the method may further include: The access network device starts a first timer, and periodically sends the sixth message to the user equipment, to notify the user equipment that the first multicast session is to be released or is to be deactivated. Repeat the foregoing step 802 to step 804, or repeat the foregoing step 805 to step 808.

In the foregoing method, the access network device may send the ninth message to the core network device after the first preset time period. In other words, when the access network device has determined to release or deactivate the first multicast session, the access network device sends the ninth message to the core network device, to request the core network device to release or deactivate the first multicast session. In this case, after receiving the ninth message, the core network device releases or deactivates the first multicast session.

In the foregoing method, the access network device requests the core network device to release or deactivate the first multicast session after the first preset time period. In other words, the access network device requests the core network device to release or deactivate the first multicast session only after determining to release or deactivate the first multicast session. In this way, implementation of the core network device is simple.

In addition, it should be further noted that the access network device may alternatively send the ninth message to the core network device within the first preset time period.

In embodiments of this application, at least one of the first preset time period, the second preset time period, and the third preset time period may be implemented by using a timer.

The following describes in detail the technical solutions in embodiments of this application with reference to specific examples.

Example 1

Figure 9:
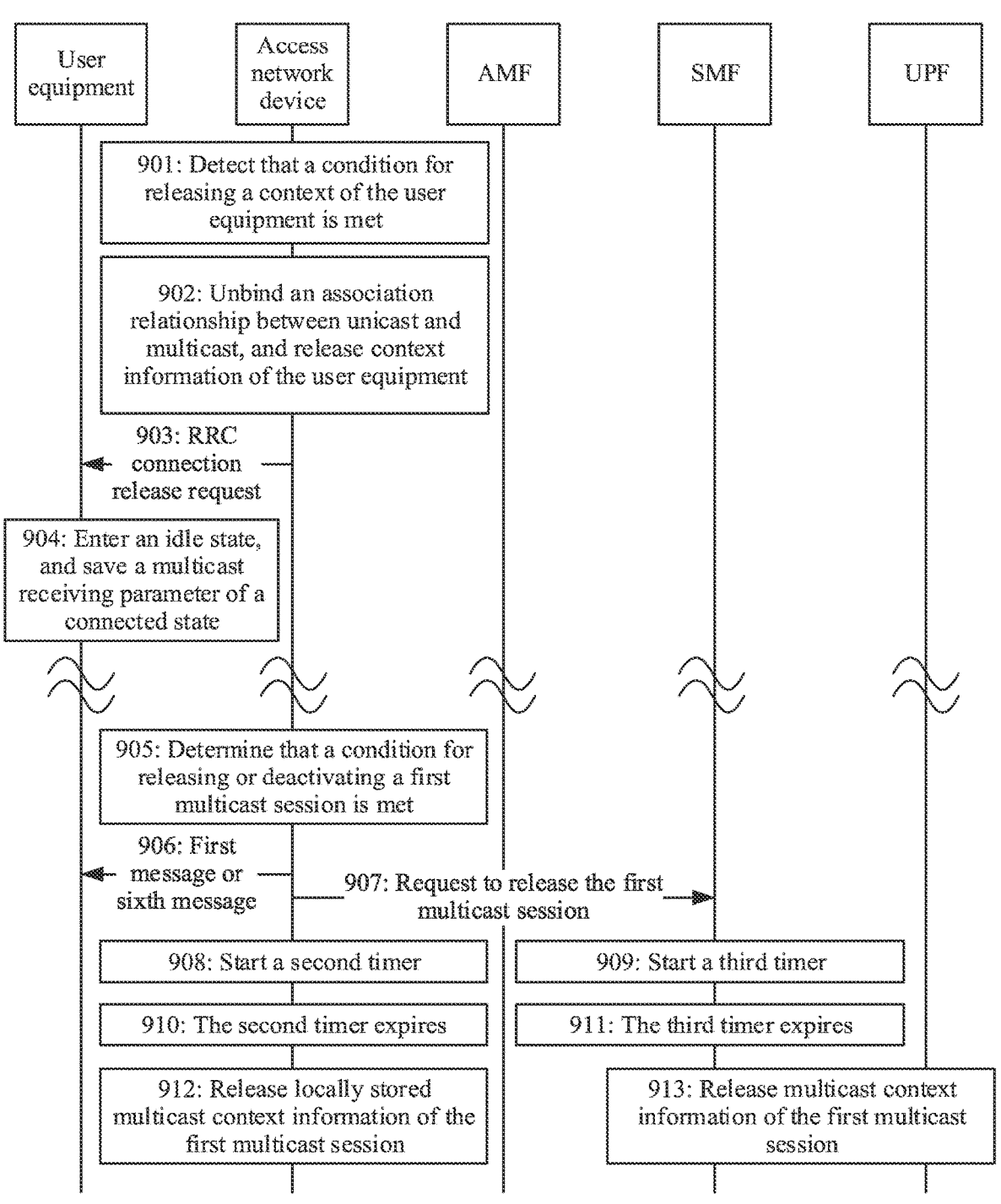
FIG. 9 is an example of a communication method according to an embodiment of this application.

FIG. 9 is an example of a communication method according to this application. In FIG. 9, an example in which a core network device includes an AMF, an SMF, and a UPF is used. In this example, when there is no feedback from user equipment within a first preset time period, a multicast session continues to be released.

Step 901: An access network device detects that a condition for releasing a context of the user equipment is met.

It may be understood that the access network device triggers AN release of the user equipment.

Step 902: The access network device unbinds or releases an association relationship between unicast and multicast of the user equipment, and releases context information of the user equipment.

It may be understood that the access network device considers that the user equipment does not continue to receive multicast data of a first multicast session.

Step 903: The access network device sends an RRC connection release request message to the user equipment.

Correspondingly, the user equipment receives the RRC connection release request message from the access network device.

Step 904: The user equipment enters an idle state, and saves a multicast receiving parameter of a connected state.

Step 905: The access network device determines that a condition for releasing or deactivating the first multicast session is met.

For more detailed descriptions of step 901 to step 905, refer to step 501 to step 505. Details are not described herein again.

Step 906: The access network device sends a message to the user equipment, to notify the user equipment that the first multicast session is to be released or is to be deactivated. The message may be the first message or the sixth message described above.

The access network device may send the message in a broadcast manner. For example, the access network device sends the message in an SIB manner. For another example, the access network device broadcasts the message by using a multicast-specific channel.

In this case, the message may include first information, and the first information is information used to uniquely determine the first multicast session. Optionally, the first information may be one or more of the following information: an identifier of the first multicast session, a G-RNTI corresponding to the first multicast session, an identifier of a first multicast group, a TMGI of the first multicast group, an IP address of an application server corresponding to the first multicast session, a service identifier corresponding to the first multicast session, packet filtering information corresponding to the first multicast session, an SDF identification rule corresponding to the first multicast session, ID information of an application corresponding to the first multicast session, target IP address information of multicast data of the first multicast session, context identifier information of the first multicast session, and the like.

The access network device may alternatively send the first message by using a multicast transmission resource corresponding to the first multicast session. In this case, the message may include the first information, or may not include the first information. This is not specifically limited.

Optionally, the message may be a dedicated message used to release or deactivate the multicast session.

Optionally, the message may also be a message used to collect statistics on currently received multicast data.

Step 907: The access network device sends a message to the SMF.

The message may be used to request to release or deactivate the first multicast session (releasing is used as an example in FIG. 8). Alternatively, it may be described as that the message is used to release or deactivate a multicast transmission channel between the UPF and a RAN.

The UPF and the SMF herein may be a UPF and an SMF that are configured to transmit downlink multicast data.

The message may be a dedicated message used for multicast, or the request may be sent to the core network device by using a unicast message. For example, the access network device sends the message to the AMF by using an N2 message, and then the AMF sends the message to the SMF that manages a "unicast session associated with multicast". Optionally, the SMF may further send the information to a multicast SMF. The N2 message may be a UE NGAP message corresponding to the next generation application protocol (NGAP) UE RAN/AMF id, for example, a UE context release message.

Step 908: The access network device locally starts a second timer.

Timing duration of the second timer is the foregoing first preset time period.

Optionally, the access network device may start the second timer when sending the message in step 908 or after sending the message; or when sending the message in step 807 or after sending the message.

Step 909: The SMF locally starts a third timer.

Timing duration of the third timer is the foregoing third preset time period.

Optionally, the SMF may start the third timer when receiving the message in step 908 or after receiving the message.

Functions of the second timer and the third timer are as follows: If the first multicast session is not prevented from being released or deactivated subsequently, when the timer expires, a device corresponding to the timer may release or deactivate locally stored multicast context information of the first multicast session. Therefore, both the second timer and the third timer are maintained for releasing or deactivating a downlink channel of the first multicast session, that is, the second timer and the third timer are associated with a downlink transmission channel between the UPF and the RAN of the first multicast session.

Step 910: The second timer in the access network device expires.

Step 911: The third timer in the SMF expires.

That the second timer expires indicates that within the timing duration of the second timer, no user equipment feeds back that the first multicast session is being used or is to be used. It is same for the third timer.

For example, the first multicast session is released when the second timer and the third timer expire. After the second timer expires, step 912 continues to be performed, and after the third timer expires, step 913 continues to be performed.

Step 912: The access network device releases the locally stored multicast context information of the first multicast session.

For example, the access network device may release the information about the user equipment list in step 502.

Step 913: The SMF releases the locally stored multicast context information of the first multicast session.

For example, content released by the SMF may be stored address identification information of the access network device, for example, a tunnel ID of the access network device.

Optionally, the SMF may further notify the UPF of releasing related content. The content includes one or more of the following: address identification information that is of the access network device and stored in the UPF, a locally configured data forwarding rule of the UPF, and the like. The releasing the locally configured data forwarding rule of the UPF may be: deleting the forwarding rule itself or modifying the forwarding rule, for example, "no forwarding" is configured.

If the first multicast session is deactivated when the second timer and the third timer expire, the access network device and the SMF may perform the following procedure.

The access network device releases the locally stored multicast context information of the first multicast session.

The SMF deletes locally stored access network related information of the first multicast session.

For example, content deleted by the SMF may be stored address identification information of the access network device, for example, a tunnel ID of the access network device.

Optionally, the SMF may further notify the UPF of modifying a current processing rule for the multicast data. The content includes one or more of the following: a forwarding rule (FAR), for example, after receiving downlink multicast data corresponding to the multicast session, the UPF do not forward the data to a specific access network device; and a notification rule, for example, after receiving the downlink multicast data corresponding to the multicast session, the UPF reports, to the SMF, that the downlink data is received.

In Example 1, the access network device may notify the user equipment that the first multicast session is to be released or is to be deactivated, so that the user equipment can feed back to the access network device that the user equipment is still interested in the multicast service. This helps the access network device determine whether to continue to release or deactivate a downlink transmission channel subsequently. In addition, the access network device and the core network device separately maintain the timer, and when the timer expires, separately delete the downlink transmission channel of the first multicast session. An advantage of this is that a notification message that is notified by the access network device to the core network device may depend on unicast signaling of "last leaving user equipment", and little change is made to an existing procedure.

Example 2

Figure 10:
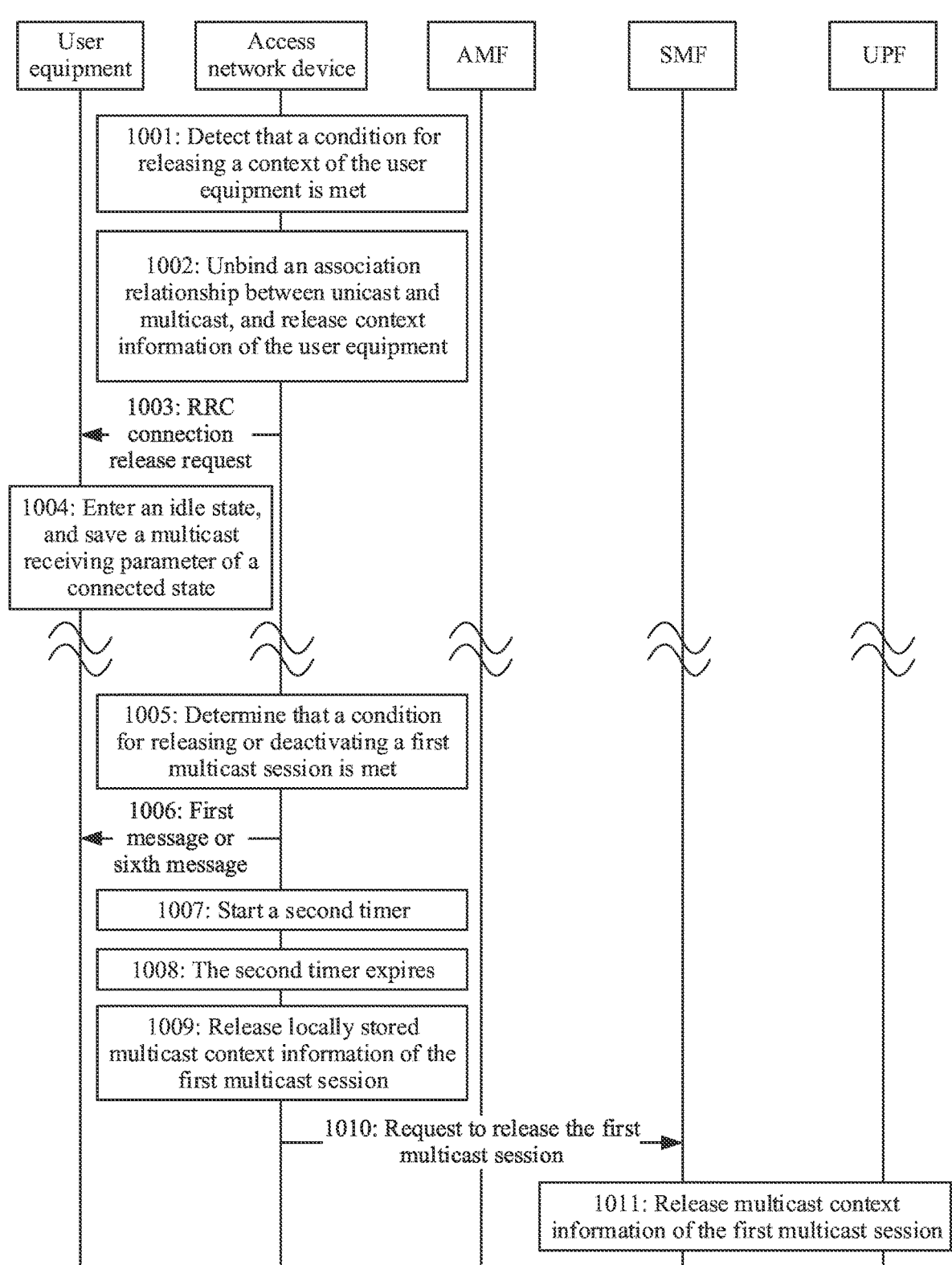
FIG. 10 is another example of a communication method according to an embodiment of this application.

FIG. 10 is another example of a communication method according to an embodiment of this application. In FIG. 10, an example in which a core network device includes an AMF, an SMF, and a UPF is also used. In this example, when there is no feedback from user equipment within a first preset time period, multicast continues to be released or deactivated.

A difference between this example and Example 1 lies in that an access network device notifies, when a second timer expires, the SMF of releasing or deactivating a first multicast session only if the access network device receives no feedback from the user equipment.

For implementations of step 1001 to step 1006 in this example, refer to step 901 to step 906. Details are not described herein again.

Step 1007: The access network device locally starts the second timer.

Timing duration of the second timer is the foregoing first preset time period.

Optionally, the access network device may locally start the second timer when sending the message in step 906 or after sending the message.

For descriptions of the second timer, refer to related descriptions in FIG. 9.

Step 1008: The second timer in the access network device expires.

That the second timer expires indicates that within the timing duration of the second timer, no user equipment feeds back that the first multicast session is to be used.

For example, the first multicast session is released when the second timer expires. After the second timer expires, step 1009 to step 1011 continue to be performed.

Step 1009: The access network device releases the locally stored multicast context information of the first multicast session.

For example, the access network device may release the information about the user equipment list in step 502.

Step 1010: The access network device sends a message to the SMF.

The message may be used to request to release the first multicast session, or it may be described as that the message is used to release or deactivate a multicast transmission channel between the UPF and a RAN.

The UPF and the SMF herein may be a UPF and an SMF that are configured to transmit downlink multicast data.

Step 1011: The SMF releases the locally stored multicast context information of the first multicast session.

For example, content released by the SMF may be stored address identification information of the access network device (for example, a tunnel ID of the access network device).

Optionally, the SMF may further notify the UPF of releasing related content. The content includes one or more of the following: address identification information that is of the access network device and stored in the UPF, a locally configured data forwarding rule of the UPF, and the like. The releasing the locally configured data forwarding rule of the UPF may be: deleting the forwarding rule itself or modifying the forwarding rule, for example, "no forwarding" is configured.

It should be noted that a sequence of step 1009 and step 1010 is not limited in this embodiment of this application.

If the first multicast session is deactivated when the second timer expires, the access network device and the SMF may perform the following procedure.

The access network device releases the locally stored multicast context information of the first multicast session.

The SMF deletes locally stored access network related information of the first multicast session.

For example, content deleted by the SMF may be stored address identification information of the access network device (for example, a tunnel ID of the access network device).

Optionally, the SMF may further notify the UPF of modifying a current processing rule for the multicast data. The content includes one or more of the following: a forwarding rule, for example, after receiving downlink multicast data corresponding to the multicast session, the UPF do not forward the data to a specific access network device; and a notification rule, for example, after receiving the downlink multicast data corresponding to the multicast session, the UPF reports, to the SMF, that the downlink data is received.

In Example 2, the access network device may notify the user equipment that the first multicast session is to be released or is to be deactivated, so that the user equipment can feed back to the access network device that the user equipment is still interested in the multicast service. This helps the access network device determine whether to continue to release or deactivate a downlink transmission channel subsequently. In addition, the access network device maintains the timer. When the timer expires, the access network device deletes the downlink transmission channel of the first multicast session, and notifies the core network device of releasing the first multicast session. An advantage of this is that the core network device does not need to maintain the timer, and implementation is simple.

Example 3

Figure 11:
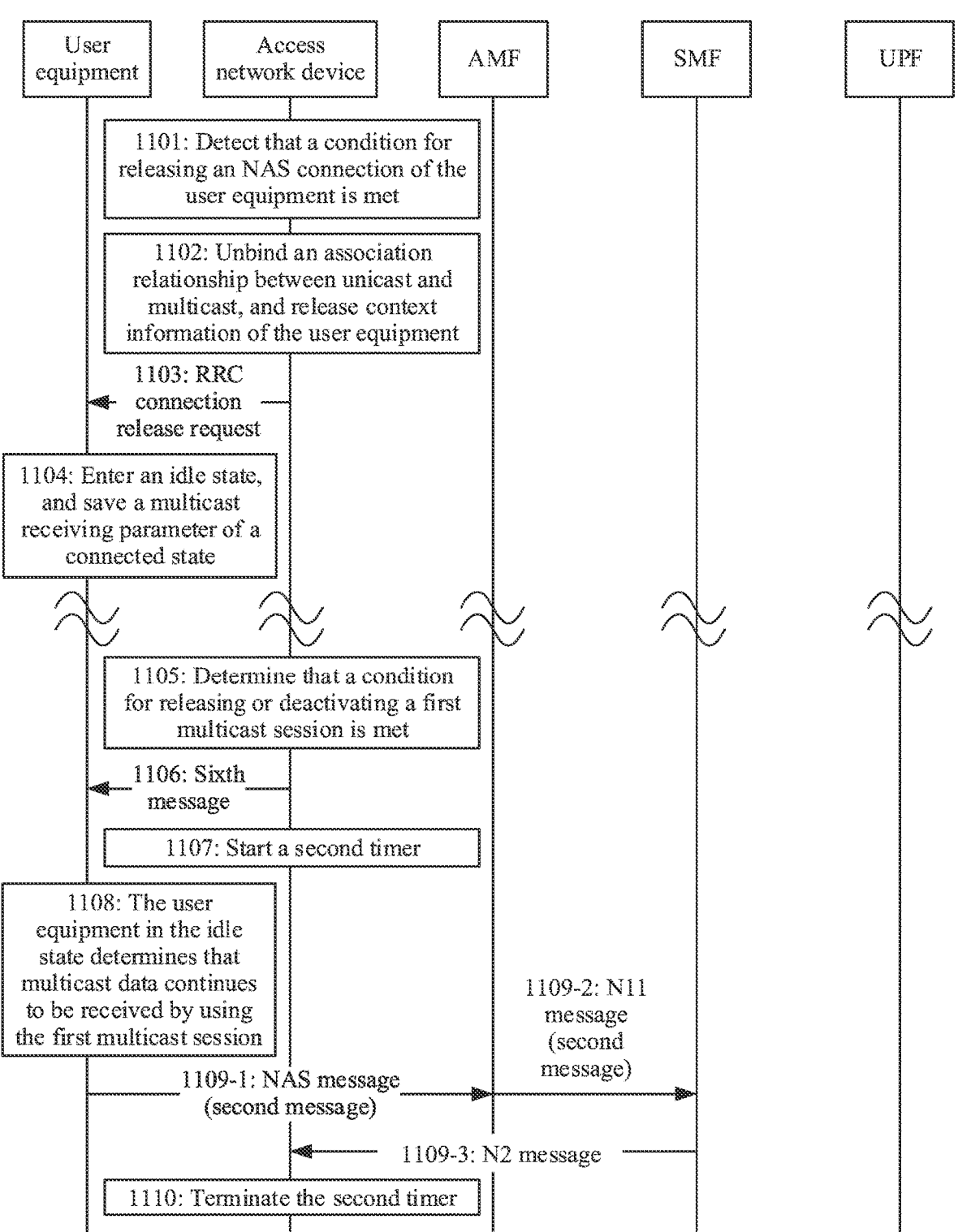
FIG. 11 is another example of a communication method according to an embodiment of this application.

FIG. 11 is another example of a communication method according to an embodiment of this application. In FIG. 11, an example in which a core network device includes an AMF, an SMF, and a UPF is also used. In this example, when user equipment feeds back within a first preset time period, an access network device and the core network device give up releasing or deactivating a first multicast session. In this example, the user equipment feeds back, to the access network device by using the core network device, that the user equipment is using or is about to use the first multicast session.

For implementations of step 1101 to step 1106 in this example, refer to step 901 to step 906. Details are not described herein again.

Step 1107: The access network device locally starts a second timer.

Timing duration of the second timer is the foregoing first preset time period.

Optionally, the access network device may locally start the second timer when sending the sixth message in step 1106 or after sending the sixth message.

For descriptions of the second timer, refer to related descriptions in FIG. 8.

Step 1108: After receiving the sixth message or when receiving the sixth message, the user equipment determines that multicast data is being or is to be received by using the first multicast session.

Step 1109: The user equipment feeds back, to the access network device, that the user equipment is using or is about to use the first multicast session.

Because the user equipment may continue to receive the multicast data by using the first multicast session, the user equipment may send the message to the access network device, to notify the access network device that the user equipment is using or is about to use the first multicast session. Therefore, the network side is prevented from releasing or deactivating the first multicast session.

Optionally, the message sent by the user equipment may include second information, and the second information may include one or more of the following information:

(a) unicast PDU session identifier corresponding to the multicast service, for example, a PDU session ID; and (b) identification information of the multicast service.

The identification information of the multicast service may be one or more of the following information: an identifier of the first multicast session, a G-RNTI corresponding to the first multicast session, an identifier of a first multicast group, a TMGI of the first multicast group, an IP address of an application server corresponding to the first multicast session, a service identifier corresponding to the first multicast session, packet filtering information corresponding to the first multicast session, an SDF identification rule corresponding to the first multicast session, ID information of an application corresponding to the first multicast session, target IP address information of multicast data of the first multicast session, context identifier information of the first multicast session, and the like.

In FIG. 11, an example in which the core network device sends the message to the access network device is used.

In some implementations, step 1109 may be implemented by using step 1109-1, step 1109-2, and step 1109-3.

Step 1109-1: The access network device sends an NAS message to the AMF. Correspondingly, the AMF receives the NAS message sent by the user equipment.

Optionally, the NAS message may include the foregoing second information.

Optionally, the NAS message may be a service request message.

Step 1109-2: After receiving the NAS message, the AMF sends an N11 message to the SMF based on the PDU session ID included in the NAS message and a locally stored correspondence between the PDU session ID and the SMF. Correspondingly, the SMF receives the N11 message.

The N11 message may include the foregoing second information.

Steps 1109-3: After receiving the N11 message, the SMF initiates a subsequent procedure of sending context information of the user equipment to the access network device. Specifically, the SMF sends an N2 message to the access network device. The N2 message includes related information of the multicast service. For example, the N2 message may include identification information of the multicast service, QoS information of the multicast service, and the like.

In some implementations, if information used for multicast is stored in an SMF (referred to as an M-SMF below) that manages the multicast service, the SMF finds a corresponding M-SMF after receiving the N11 message. For example, based on the locally stored association relationship between the PDU session ID and the multicast service (the identification information of the M-SMF is also included), the SMF sends an N16 message to the M-SMF, to initiate the subsequent procedure of sending the context information of the user equipment to the access network device. For example, the SMF obtains a corresponding multicast session identifier and a latest QoS parameter from the M-SMF.

In some other implementations, if the information used for multicast is stored in the SMF instead of the M-SMF, the SMF does not need to interact with the M-SMF. In other words, after receiving the N11 message, the SMF initiates the subsequent procedure of sending the context information of the user equipment to the access network device without interacting with the M-SMF.

Step 1110: After receiving the N2 message, the access network device terminates the second timer started in step 1107, and gives up releasing or deactivating the first multicast session.

It should be noted that, if the access network device sends, to the SMF after step 1105, the message used to request to release or deactivate the first multicast session, the SMF may further stop corresponding counting of the third timer based on the identification information of the multicast data.

In Example 3, the access network device may notify the user equipment that the first multicast session is to be released or is to be deactivated, so that the user equipment can feed back to the access network device that the user equipment is still interested in the multicast service. This helps the access network device determine whether to continue to release or deactivate a downlink transmission channel subsequently. In addition, in Example 3, the user equipment initiates an NAS procedure, so that the core network cancels timing of the timer, and further indicates the RAN to cancel timing of the timer.

Example 4

Figure 12:
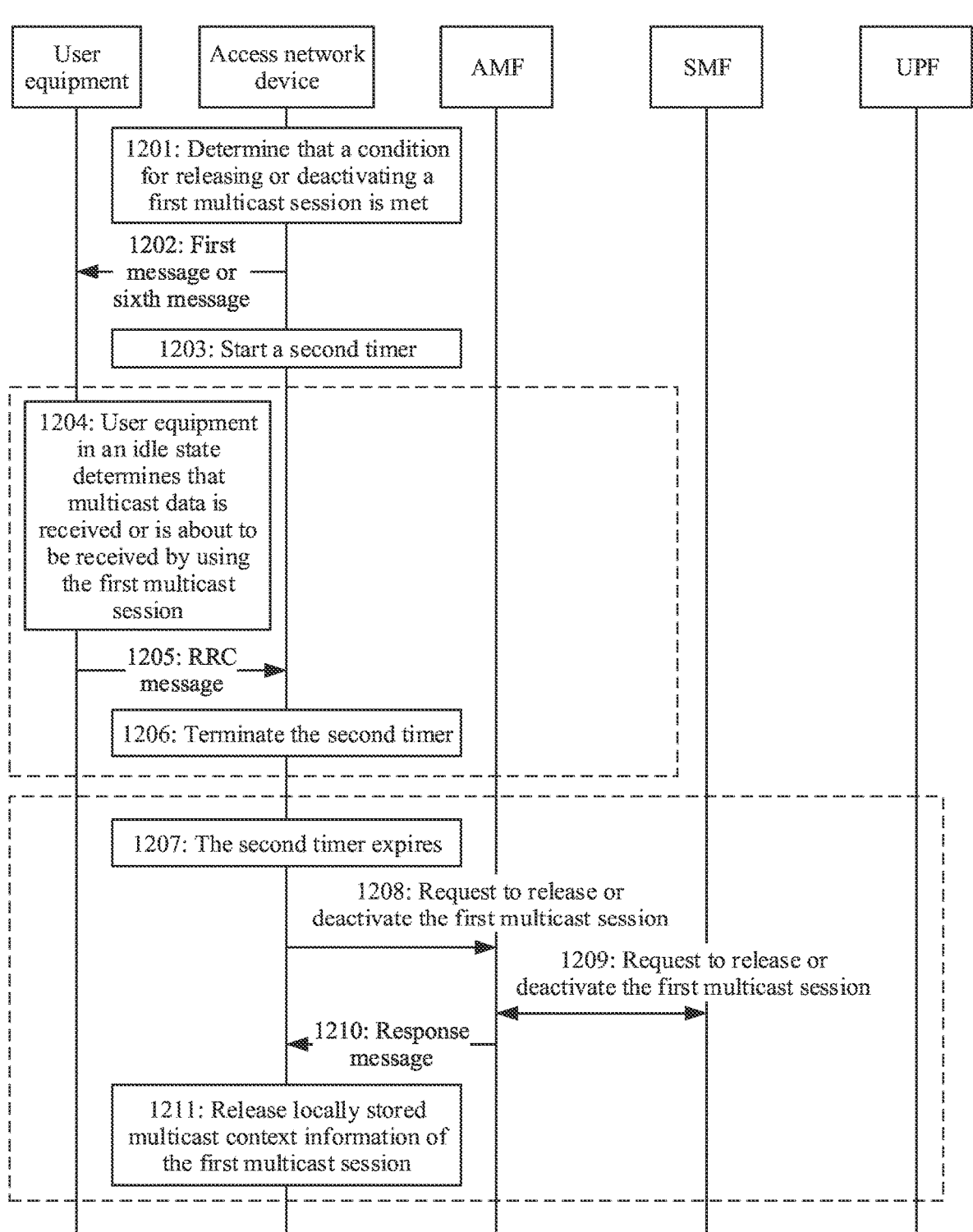
FIG. 12 is another example of a communication method according to an embodiment of this application.

FIG. 12 is another example of a communication method according to an embodiment of this application. In FIG. 12, an example in which a core network device includes an AMF, an SMF, and a UPF is also used. In this example, user equipment feeds back, to an access network device by using an RRC message or another type of air interface message, that the user equipment is using or is about to use a first multicast session.

In this example, for an implementation of step 1201, refer to the description of step 201; for an implementation of step 1202, refer to the description of step 1006; and for an implementation of step 1203, refer to the description of step 1007. Details are not described herein again.

After sending a first message or a sixth message (the first message is used as an example below) and starting a second timer, the access network device may perform step 1204 to step 1211.

Step 1204: After receiving the first message or when receiving the first message, the user equipment determines that multicast data is being or is to be received by using the first multicast session.

Step 1205: The user equipment sends the RRC message or another type of air interface message to the access network device, to notify the access network device that the user equipment is using or is about to use the first multicast session.

Because the user equipment determines to continue to receive the multicast data by using the first multicast session, the user equipment may send the RRC message or another type of air interface message to the access network device, to notify the access network device that the user equipment is using or is about to use the first multicast session. Therefore, the network side is prevented from releasing or deactivating the first multicast session.

The RRC message or another type of air interface message may include the foregoing second information. For descriptions of the second information, refer to the foregoing description. Details are not described herein again.

Step 1206: After receiving the RRC message or another type of air interface message, the access network device terminates counting of the second timer, and gives up releasing or deactivating the first multicast session.

It should be noted that if the access network device has sent, to the core network device, a message used to request to release or deactivate the first multicast session, after receiving the RRC message or another type of air interface message, the access network device may further indicate the core network device to stop corresponding counting of the third timer.

For example, the access network device sends, to the core network device after the first preset time period, the message used to request to release or deactivate the first multicast session.

Step 1207: The access network device detects that the second timer expires.

Step 1208: The access network device sends a message to the AMF.

The message may be used to request to release or deactivate the first multicast session.

Step 1209: The AMF and the SMF perform signaling interaction.

For details, refer to descriptions of step 1109-2 and step 1109-3. Details are not described herein again.

Step 1210: The AMF sends a response message to the access network device, to indicate the access network device to continue to release or deactivate the first multicast session.

Step 1211: The access network device releases or deactivates the first multicast session.

In other words, the access network device releases locally stored multicast context information of the first multicast session.

It should be noted that if step 1211 is performed before step 1210 (that is, when the second timer expires, the access network device may release or deactivate the first multicast session without waiting for an indication of the core network device), the response message may be used to notify the access network device that the core network device has released or deactivated the first multicast session.

It should be noted that step 1204 to step 1211 are optional steps. For example, the method may include step 1204 to step 1206. For another example, the method may include step 1207 to step 1211. For still another example, the method may also include step 1204 to step 1211.

In Example 4, the access network device may notify the user equipment that the first multicast session is to be released or is to be deactivated, so that the user equipment can feed back to the access network device that the user equipment is still interested in the multicast service. This helps the access network device determine whether to continue to release or deactivate a downlink transmission channel subsequently. In addition, in Example 4, the user equipment notifies, by using the RRC message or another type of air interface message, the network side that the user equipment is receiving or is about to receive the multicast data by using the first multicast session.

It should be noted that, in embodiments of this application, after sending a specific message may be understood as: after the message starts to be sent or after the message is sent. This is not limited. In embodiments of this application, after receiving a specific message may be understood as: after the message starts to be received or after the message is received. This is not limited.

It should be understood that the solutions in embodiments of this application may be properly combined for use, and explanations or descriptions of terms in embodiments may be cross-referenced or explained in embodiments. This is not limited.

It should be further understood that sequence numbers of the foregoing processes do not mean execution sequences in embodiments of this application. The execution sequences of the processes should be determined based on functions and internal logic of the processes. Numbers or sequence numbers in the foregoing processes are merely for differentiation for ease of description, and should not constitute any limitation on an implementation process of embodiments of this application.

The methods provided in embodiments of this application are described above in detail with reference to FIG. 2 to FIG. 12. Apparatuses provided in embodiments of this application are described below in detail with reference to FIG. 13 to FIG. 15.

Figure 13:
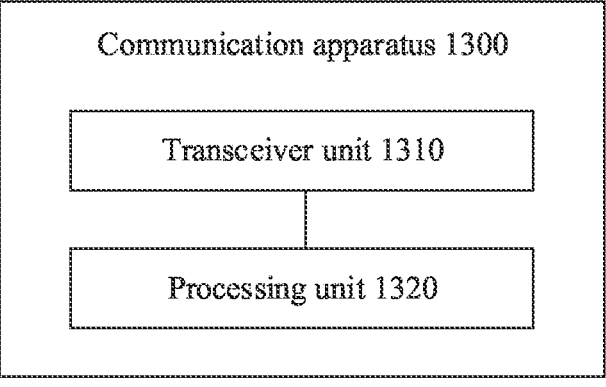
FIG. 13 is a schematic block diagram of a communication apparatus according to an embodiment of this application.

FIG. 13 is a schematic block diagram of a communication apparatus according to an embodiment of this application. A communication apparatus 1300 shown in FIG. 13 may include a transceiver unit 1310 and a processing unit 1320.

The transceiver unit 1310 may include a sending unit and/or a receiving unit. The transceiver unit 1310 may be a transceiver (including a transmitter and/or a receiver), an input/output interface (including an input interface and/or an output interface), a pin, a circuit, or the like. The transceiver unit 1310 may be configured to perform the sending and/or receiving steps in the foregoing method embodiments.

The processing unit 1320 may be a processor (which may include one or more processors), a processing circuit having a processor function, or the like, and may be configured to perform another step other than sending and receiving in the foregoing method embodiments.

Optionally, the communication apparatus may further include a storage unit. The storage unit may be a memory, an internal storage unit (for example, a register or a cache), an external storage unit (for example, a read-only memory or a random-access memory), or the like. The storage unit is configured to store instructions, and the processing unit 1320 executes the instructions stored in the storage unit, so that the communication apparatus performs the foregoing methods.

In a design, the communication apparatus 1300 may be corresponding to the access network device in any one of the foregoing methods, and may perform operations performed by the access network device in the corresponding method.

For example, the transceiver unit 1310 is configured to broadcast a first message when a preset condition is met, where the first message is used to notify that a first multicast session is to be released or is to be deactivated. The processing unit 1320 is configured to: if no second message that responds to the first message is received within a first preset time period, release or deactivate the first multicast session; and/or if a second message that responds to the first message is received within a first preset time period, retain the first multicast session.

For another example, the transceiver unit 1310 is configured to broadcast a sixth message when a preset condition is met, where the sixth message is used to notify that a first multicast session is to be released or is to be deactivated. The processing unit 1320 is configured to: if no eighth message is received from a core network device within a first preset time period, release or deactivate the first multicast session; and/or if an eighth message is received from a core network device within a first preset time period, retain the first multicast session, where the eighth message is used by user equipment to request to join the first multicast session.

It should be understood that the transceiver unit 1310 and the processing unit 1320 may further perform other operations performed by the access network device in any one of the foregoing methods. Details are not described herein again.

In a design, the communication apparatus 1300 may be corresponding to the user equipment in any one of the foregoing methods, and may perform operations performed by the user equipment in the corresponding method.

For example, the transceiver unit 1310 is configured to receive a first message from an access network device, where the first message is used to notify that a first multicast session is to be released or is to be deactivated; and if the first multicast session is being used or is to be used, send, to the access network device, a second message that responds to the first message.

For another example, the transceiver unit 1310 is configured to receive a sixth message from an access network device, where the sixth message is used to notify that a first multicast session is to be released or is to be deactivated; and if data is being received or is to be received by using the first multicast session, send a seventh message to a core network device, where the seventh message is used to request to join the first multicast session.

It should be understood that the transceiver unit 1310 and the processing unit 1320 may further perform other operations performed by the user equipment in any one of the foregoing methods. Details are not described herein again.

In a design, the communication apparatus 1300 may be corresponding to the core network device in any one of the foregoing methods, and may perform operations performed by the core network device in the corresponding method.

For example, the transceiver unit 1310 is configured to receive a third message from an access network device, where the third message is used to request to release or deactivate a first multicast session. The processing unit 1320 is configured to release or deactivate the first multicast session based on the third message.

For another example, the transceiver unit 1310 is configured to receive a third message from an access network device, where the third message is used to request to release or deactivate a first multicast session. The processing unit 1320 is configured to: if no fifth message received within a third preset time period, release or deactivate the first multicast session; and/or if the fifth message is received within the third preset time period, retain the first multicast session, where the fifth message indicates to retain the first multicast session.

For still another example, the transceiver unit 1310 is configured to receive a seventh message from user equipment, where the seventh message is used to request to join a first multicast session; and send an eighth message to an access network device, where the eighth message is used to request to add the user equipment to the first multicast session.

For yet another example, the transceiver unit 1310 is configured to receive a ninth message from an access network device, where the ninth message is used to request to release or deactivate a first multicast session. The processing unit 1320 is configured to: if no seventh message is received from user equipment within a second preset time period, release or deactivate the first multicast session; and/or if a seventh message from user equipment is received within a second preset time period, retain the first multicast session; and send an eighth message to the access network device, where the eighth message is used to request to add the user equipment to the first multicast session, and the seventh message is used to request to join the first multicast session.

It should be understood that the transceiver unit 1310 and the processing unit 1320 may further perform other operations performed by the core network device in any one of the foregoing methods. Details are not described herein again.

It should be understood that division of the foregoing units is merely function division, and there may be another division method during actual implementation.

It should be further understood that the processing unit may be implemented by using hardware, may be implemented by using software, or may be implemented by using a combination of software and hardware.

Figure 14:
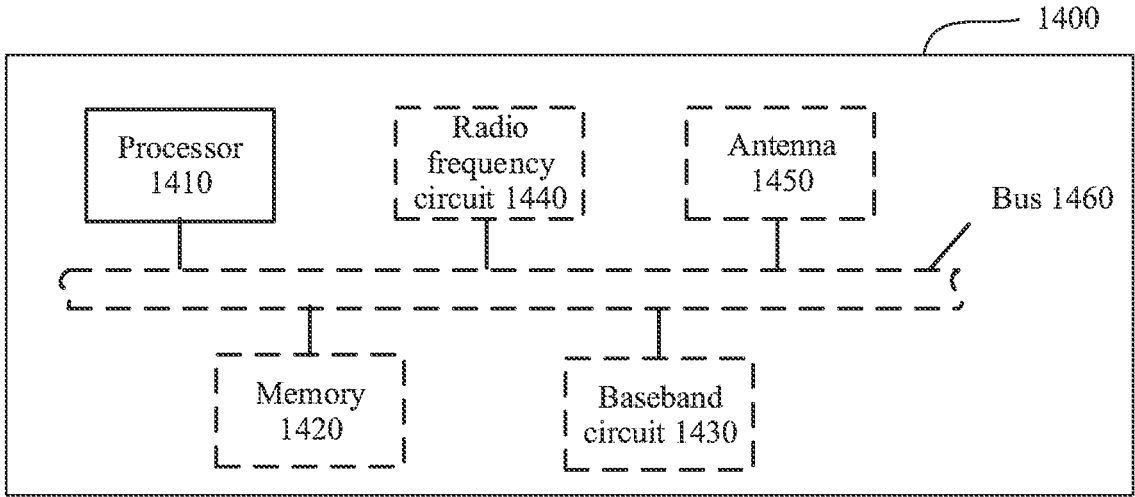
FIG. 14 is a schematic diagram of a structure of a communication apparatus according to this application.

FIG. 14 is a schematic diagram of a structure of a communication apparatus according to this application. As shown in FIG. 14, the communication apparatus 1400 may implement a function that can be implemented by any network element in any one of the foregoing method embodiments.

The communication apparatus 1400 may include a processor 1410. The processor 1410 may also be referred to as a processing unit, and may implement a specific control function. The processor 1410 may be configured to control the communication apparatus 1400, execute a software program, and process data of the software program.

In an optional design, the processor 1410 may further store instructions and/or data. The instructions and/or the data may be run on the processor 1410, so that the communication apparatus 1400 performs the method described in the foregoing method embodiments.

Optionally, the communication apparatus 1400 may a memory 1420. The memory 1420 may store instructions, and the instructions may be run on the processor, so that the communication apparatus 1400 performs the method described in the foregoing method embodiments. Optionally, the memory may further store data. Optionally, the processor may also store instructions and/or data. The processor and the memory may be separately disposed, or may be integrated together. For example, the correspondence described in the foregoing method embodiments may be stored in the memory or stored in the processor.

Optionally, the communication apparatus 1400 may include a baseband circuit 1430, and the baseband circuit 1430 is mainly configured to perform baseband processing.

Optionally, the communication apparatus 1400 may include a radio frequency circuit 1440. The radio frequency circuit 1440 is mainly configured to: send and receive a radio frequency signal, and perform conversion between a baseband signal and a radio frequency signal, for example, configured to send the BAR frame in the foregoing method embodiments. The radio frequency circuit 1440 may also be referred to as a transceiver unit, a transceiver machine, a transceiver circuit, a transceiver, or the like.

Optionally, the communication apparatus 1400 may include an antenna 1450, mainly configured to send and receive a signal.

Optionally, the communication apparatus 1400 may include a bus 1460, configured to connect parts of the communication apparatus 1400, for example, the processor 1410, the memory 1420, the baseband circuit 1430, the radio frequency circuit 1440, and the antenna 1450.

Figure 15:
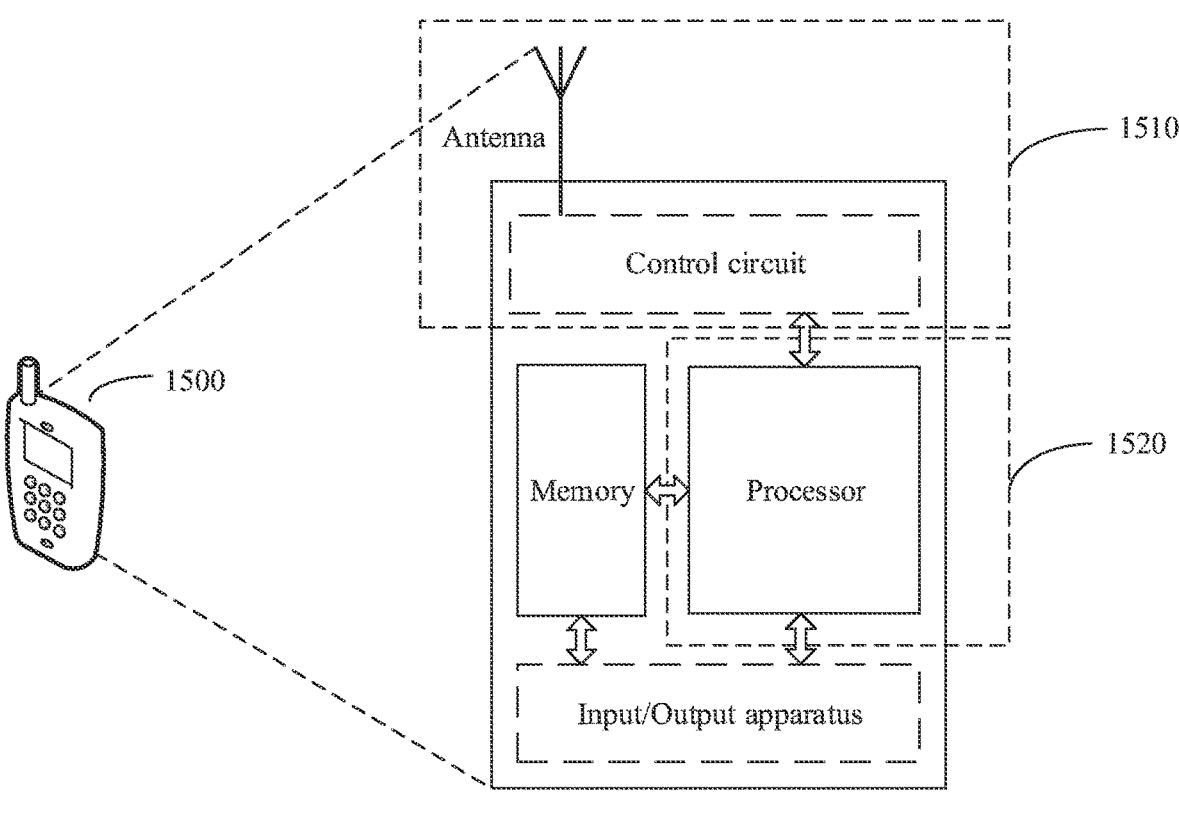
FIG. 15 is a schematic diagram of a structure of a communication apparatus according to this application.

FIG. 15 is a schematic diagram of a structure of a communication apparatus according to this application. For ease of description, FIG. 15 shows only main components of the communication apparatus 1500. The communication apparatus 1500 may implement a function of the user equipment in any one of the foregoing method embodiments.

As shown in FIG. 15, the communication apparatus 1500 includes a processor and a memory.

Optionally, the communication apparatus 1500 includes a control circuit, an antenna, and an input/output apparatus.

The processor is mainly configured to process a communication protocol and communication data, control the entire communication apparatus 1500, execute a software program, and process data of the software program, for example, configured to support the communication apparatus 1500 in performing an operation performed by the user equipment described in the foregoing method embodiments. The memory is mainly configured to store the software program and data. The control circuit is mainly configured to convert a baseband signal and a radio frequency signal and process the radio frequency signal. The control circuit and the antenna together may also be referred to as a transceiver, and are mainly configured to receive and send a radio frequency signal in a form of an electromagnetic wave. The input/output apparatus, such as a touchscreen, a display, or a keyboard, is mainly configured to: receive data input by a user and output data to the user.

After the communication apparatus 1500 is powered on, the processor may read a software program in a storage unit, interpret and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, by using the antenna, a radio frequency signal in an electromagnetic wave form. When data is sent to the communication apparatus 1500, the radio frequency circuit receives the radio frequency signal by using the antenna, converts the radio frequency signal into the baseband signal, and outputs the baseband signal to the processor. The processor converts the baseband signal into data, and processes the data.

A person skilled in the art may understand that for ease of description, FIG. 15 shows only one memory and one processor. In an actual communication apparatus 1500, there may be a plurality of processors and memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data, and the central processing unit is mainly configured to: control the entire communication apparatus 1500, execute the software program, and process the data of the software program. Functions of the baseband processor and the central processing unit are integrated into the processor in FIG. 15. A person skilled in the art may understand that the baseband processor and the central processing unit may be independent processors, and are interconnected by using a technology such as a bus. A person skilled in the art may understand that the communication apparatus 1500 may include a plurality of baseband processors to adapt to different network standards, the communication apparatus 1500 may include a plurality of central processing units to improve a processing capability of the communication apparatus 1500, and components of the communication apparatus 1500 may be connected through various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program, and the processor executes the software program to implement a baseband processing function.

For example, in this embodiment of this application, an antenna having sending and receiving functions and a control circuit may be considered as the transceiver unit 1510 of the communication apparatus 1500, and a processor having a processing function may be considered as the processing unit 1520 of the communication apparatus 1500. As shown in FIG. 15, the communication apparatus 1500 includes the transceiver unit 1510 and the processing unit 1520. The transceiver unit may also be referred to as a transceiver, a transceiver machine, a transceiver apparatus, or the like. Optionally, a component configured to implement a receiving function in the transceiver unit 1510 may be considered as a receiving unit, and a component configured to implement a sending function in the transceiver unit 1510 may be considered as a sending unit. In other words, the transceiver unit 1510 includes the receiving unit and the sending unit. For example, the receiving unit may also be referred to as a receiver, a receive machine, or a receiving circuit, and the sending unit may also be referred to as a transmitter, a transmit machine, or a transmitting circuit.

It should be noted that, the processor in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, a discrete hardware component, a system on chip (SoC), a central processing unit (CPU), a network processor (NP), a micro controller unit (MCU), a programmable logic device (PLD), or another integrated chip. It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

According to the methods provided in embodiments of this application, this application further provides a computer program product. The computer program product includes computer program code. When the computer program code is run on a computer, the computer is enabled to perform an operation performed by any network element (for example, user equipment, an access network device, and a core network device) in any one of the foregoing method embodiments.

According to the methods provided in embodiments of this application, this application further provides a computer-readable medium. The computer-readable medium stores program code. When the program code is run on a computer, the computer is enabled to perform an operation performed by any network element (for example, user equipment, an access network device, and a core network device) in the foregoing method embodiments.

According to the methods provided in embodiments of this application, this application further provides a system. The system includes one or more network elements in the foregoing method embodiments.

An embodiment of this application further provides a communication apparatus, including a processor and an interface. The processor is configured to perform the method in any one of the foregoing method embodiments.

It should be understood that the communication apparatus may be a chip. For example, the processing apparatus may be a field programmable gate array (FPGA), may be a general-purpose processor, a digital signal processor (DSP), an application specific integrated circuit (ASIC), the field programmable gate array (FPGA), another programmable logic device, a discrete gate, a transistor logic device, or a discrete hardware component, may be a system on chip (SoC), may be a central processing unit (CPU), may be a network processor (network processor, NP), may be a digital signal processor (DSP), may be a micro controller unit (MCU), or may be a programmable logic device (PLD) or another integrated chip. It may implement or perform the methods, the steps, and logical block diagrams that are disclosed in embodiments of this application. The general-purpose processor may be a microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, a solid state disc (SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step may be performed by the processing unit (the processor). For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, or a computer. As illustrated by using figures, both a computing device and an application that runs on the computing device may be components. One or more components may reside within a process or an execution thread, and a component may be located on one computer or distributed between two or more computers. In addition, these components may be executed from various computer-readable media that store various data structures. For example, the components may communicate by using a local or remote process based on a signal having one or more data packets (for example, data from two components interacting with another component in a local system, in a distributed system, or across a network such as the Internet interacting with another system by using the signal).

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments by using any appropriate manner.

It should be understood that, in embodiments of this application, numbers "first", "second", and the like are merely for distinguishing between different objects, for example, to distinguish between different network devices, and do not constitute a limitation on the scope of embodiments of this application. Embodiments of this application are not limited thereto.

It should be further understood that, in this application, both "when" and "if" mean that a network element performs corresponding processing in an objective situation, but do not constitute a limitation on time, do not require that the network element has a determining action during implementation, and do not mean other limitations either.

It should be further understood that, in this application, "at least one" means one or more, and "a plurality of" means two or more.

It should be further understood that, in embodiments of this application, "B corresponding to A" indicates that B is associated with A, and B may be determined based on A. However, it should be further understood that determining B based on A does not mean that B is determined based only on A. B may alternatively be determined based on A and/or other information.

It should also be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Unless otherwise specified, an expression used in this application similar to an expression that "an item includes one or more of the following: A, B, and C" usually means that the item may be any one of the following: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and another combination of A, B and C. In the foregoing descriptions, three elements A, B, and C are used as an example to describe an optional case of the item. When an expression is "the item includes at least one of the following: A, B, . . . , and X", in other words, more elements are included in the expression, a case to which the item is applicable may also be obtained according to the foregoing rule.

It may be understood that, in embodiments of this application, the terminal device and/or the network device may perform some or all steps in embodiments of this application. These steps or operations are merely examples. In embodiments of this application, other operations or variations of various operations may be further performed. In addition, the steps may be performed in a sequence different from a sequence presented in embodiments of this application.

tion, and not all the operations in embodiments of this application may be performed.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:

broadcasting, by an access network device, a first message, wherein the first message is used to notify that a first multicast session is to be released or is to be deactivated;

sending, by the access network device, a third message to a core network device, wherein the third message is used to request to release or deactivate the first multicast session;

detecting, by the access network device, whether the access network device receives, within a first preset time period after sending the third message, a second message that corresponds to the first message; and if the access network device receives, within the first preset time period, no second message that responds to the first message, releasing or deactivating, by the access network device, the first multicast session; and if the access network device receives, within the first preset time period, the second message that responds to the first message, retaining, by the access network device, the first multicast session, and sending, by the access network device, a fifth message to the core network device, wherein the fifth message is used to request the core network device to retain the first multicast session.

2. The method of claim 1, before broadcasting the first message, the method further comprising:

determining that a present condition is met, wherein the preset condition comprises at least one of the following:

no data is transmitted in the first multicast session within a second preset time period;

there is no associated user equipment in a multicast group; or a first timer times out, wherein the first timer is used to monitor whether there is user equipment receiving data by using the first multicast session.

3. The method of claim 1, wherein the second message is from the user equipment.

4. The method of claim 3, wherein the second message is a radio resource control (RRC) message.

5. A communication apparatus, comprising at least one processor and a memory, wherein the at least one processor is coupled to the memory, the memory is configured to store a computer program, and the at least one processor is configured to execute the computer program stored in the memory, to cause the communication apparatus to:

broadcast a first message that is used to notify that a first multicast session is to be released or is to be deactivated;

send a third message to a core network device, wherein the third message is used to request to release or deactivate the first multicast session;

detect whether the communication apparatus receives, within a first preset time period after sending the third message, a second message that corresponds to the first message; and if the communication apparatus receives, within the first preset time period, no second message that responds to the first message, release or deactivate the first multicast session; and if the communication apparatus receives, within the first preset time period, the second message that responds to the first message, retain the first multicast session, and send a fifth message to the core network device, wherein the fifth message is used to request the core network device to retain the first multicast session.

6. The communication apparatus of claim 5, wherein the communication apparatus is further caused to:

determine that a present condition is met, wherein the preset condition comprises at least one of the following:

no data is transmitted in the first multicast session within a second preset time period;

there is no associated user equipment in a multicast group; or a first timer times out, wherein the first timer is used to monitor whether there is user equipment receiving data by using the first multicast session.

7. The communication apparatus of claim 5, wherein the second message is from the user equipment.

8. The communication apparatus of claim 7, wherein the second message is a radio resource control (RRC) message.

9. A non-transitory computer-readable storage medium comprising a computer program code for execution by a processor of an access network device, the computer program code comprising instructions for:

broadcasting a first message, wherein the first message is used to notify that a first multicast session is to be released or is to be deactivated;

sending a third message to a core network device, wherein the third message is used to request to release or deactivate the first multicast session;

detecting whether the access network device receives, within a first preset time period after sending the third message, a second message that corresponds to the first message; and if the access network device receives, within the first preset time period, no second message that responds to the first message, releasing or deactivating the first multicast session; and if the access network device receives, within the first preset time period, the second message that responds to the first message, retaining the first multicast session, and sending a fifth message to the core network device, wherein the fifth message is used to request the core network device to retain the first multicast session.

10. The non-transitory computer-readable storage medium of claim 9, wherein the computer program code further comprises instructions for:

determining that a present condition is met, wherein the preset condition comprises at least one of the following:

no data is transmitted in the first multicast session within a second preset time period;

there is no associated user equipment in a multicast group; or a first timer times out, wherein the first timer is used to monitor whether there is user equipment receiving data by using the first multicast session.

11. The non-transitory computer-readable storage medium of claim 9, wherein the second message is a radio resource control (RRC) message.

* * * * *